(12) United States Patent
Ikeda et al.

(10) Patent No.: US 11,067,402 B2
(45) Date of Patent: Jul. 20, 2021

(54) INFORMATION SYSTEM, INFORMATION PROCESSING METHOD, AND PROGRAM

(71) Applicant: Toyota Jidosha Kabushiki Kaisha, Toyota (JP)

(72) Inventors: Michio Ikeda, Nagoya (JP); Eiichi Ishii, Nisshin (JP); Mitsugu Makita, Nagoya (JP); Toru Yoshida, Miyoshi (JP); Gaku Itou, Nagoya (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 215 days.

(21) Appl. No.: 16/285,592

(22) Filed: Feb. 26, 2019

(65) Prior Publication Data
US 2019/0265053 A1 Aug. 29, 2019

(30) Foreign Application Priority Data
Feb. 27, 2018 (JP) .............................. JP2018-033559

(51) Int. Cl.
*G01C 21/34* (2006.01)
*G06F 16/29* (2019.01)
(Continued)

(52) U.S. Cl.
CPC ......... *G01C 21/3438* (2013.01); *G01C 21/38* (2020.08); *G05D 1/0291* (2013.01);
(Continued)

(58) Field of Classification Search
CPC .. G01C 21/34; G01C 21/343; G01C 21/3438; G06F 16/29; G06Q 30/0266; G06Q 30/0265; G06Q 30/0267; G09F 21/048; G09F 13/22; G09F 27/005; G09F 2013/222; G09F 2013/227; G05F 1/0088; G05F 1/0291; B64C 2201/141; G05B 2219/32388; G05D 1/0297; G05D 1/0287
See application file for complete search history.

(56) References Cited

U.S. PATENT DOCUMENTS 5,835,376 A * 11/1998 Smith .................... G08G 1/202
                                                                    701/117
10,233,021 B1 * 3/2019 Brady ................. G05D 1/0282
(Continued)

FOREIGN PATENT DOCUMENTS

JP          2010143558 A      7/2010

*Primary Examiner* — Ig T An
(74) *Attorney, Agent, or Firm* — Dinsmore & Shohl LLP

(57) ABSTRACT

An information system comprises a selector configured to select one or more mobile shop vehicles each of which functions as a meeting place for users who utilize a shopping district composed of mobile shop vehicles, from a group of the mobile shop vehicles allowed to gather in a predetermined area in order to construct the shopping district composed of the mobile shop vehicles to provide services of different classifications in a composite manner; and a manager configured to instruct the one or more mobile shop vehicles each of which functions as the meeting place to cause a change into an appearance with which it is possible for the users to distinguish, in a differentiated manner, that each of the one or more mobile shop vehicles is the meeting place in the shopping district composed of the mobile shop vehicles.

7 Claims, 12 Drawing Sheets

| VEHICLE ID | NAME OF SHOP | TYPE | DEALING COMMERCIAL PRODUCT | DEALER ID | BUSINESS HOURS | VEHICLE SIZE | NUMBER OF PEOPLE CAPABLE OF GETTING ON | PRESENT POSITION | APPEARANCE | MEETING VEHICLE |
|---|---|---|---|---|---|---|---|---|---|---|
| S001 | **** | RESTAURANT | PIZZA (T**1) | **** | 10:00-18:00 | W1, H1, D1 | 10 | X1, Y1, Z1 | **** | |
| S010 | **** | TEAROOM | SNACK (T**2) | **** | 11:00-20:00 | W1, H1, D1 | 10 | X2, Y2, Z2 | BBB-1 | ● |
| ... | ... | ... | ... | ... | ... | ... | ... | ... | ... | |
| Sn-3 | **** | FASHION | CLOTHES (Tn-1) | **** | 10:00-17:30 | W2, H2, D2 | 5 | Xn-1, Yn-1, Zn-1 | **** | |
| Sn-1 | **** | AMUSEMENT | KARAOKE (Tn-1) | **** | 13:00-21:00 | W3, H3, D3 | 20 | Xn, Yn, Zn | **** | |

(51) Int. Cl.
  *G06Q 30/02* (2012.01)
  *G09F 21/04* (2006.01)
  *G05D 1/02* (2020.01)
  *G01C 21/00* (2006.01)
  *G09F 13/22* (2006.01)
  *G09F 27/00* (2006.01)

(52) U.S. Cl.
  CPC ......... *G06F 16/29* (2019.01); *G06Q 30/0267* (2013.01); *G09F 21/048* (2013.01); *B64C 2201/141* (2013.01); *G05B 2219/32388* (2013.01); *G05D 1/0297* (2013.01); *G09F 13/22* (2013.01); *G09F 27/005* (2013.01); *G09F 2013/222* (2013.01)

(56) References Cited

U.S. PATENT DOCUMENTS

| | | | | |
|---|---|---|---|---|
| 10,248,120 | B1* | 4/2019 | Siegel | G05D 1/0223 |
| 2004/0077361 | A1* | 4/2004 | Ishidoshiro | H04L 67/26 |
| | | | | 455/456.3 |
| 2010/0036670 | A1* | 2/2010 | Hill | H04W 4/029 |
| | | | | 705/304 |
| 2012/0156337 | A1* | 6/2012 | Studor | A23F 5/26 |
| | | | | 426/231 |
| 2014/0249913 | A1* | 9/2014 | Endo | G06Q 30/02 |
| | | | | 705/14.45 |
| 2015/0356801 | A1* | 12/2015 | Nitu | G07C 9/00904 |
| | | | | 340/5.61 |
| 2017/0285628 | A1* | 10/2017 | Erhart | G05D 1/0022 |
| 2018/0246513 | A1* | 8/2018 | Cronin | G07F 9/002 |
| 2018/0272914 | A1* | 9/2018 | El-Wakeel | E04H 15/40 |
| 2019/0171209 | A1* | 6/2019 | Lee | G08G 1/144 |

\* cited by examiner

| MOVEMENT MANAGEMENT REGION | VEHICLE ID | CLASSIFI-CATION OF WAY OF USE | DEALER ID | BASE ID | PRESENT POSITION | OPERATION SITUATION |
|---|---|---|---|---|---|---|
| XX CITY XX WARD | S001 | SHOP | aa | a1 | X1, Y1 | PAUSE |
| | S002 | PASSENGER TRANSPORT | bb | b1 | X2, Y2 | IN MIDDLE OF OPERATION |
| | ... | ... | ... | ... | ... | ... |
| | Sn-1 | SHOP | cc | c1 | Xn-1, Yn-1 | IN MIDDLE OF OPERATION |
| | Sn | COLLECTION/ DELIVERY | dd | d1 | Xn, Yn | PAUSE |

FIG. 4

| VEHICLE ID | NAME OF SHOP | TYPE | DEALING COMMERCIAL PRODUCT | DEALER ID | BUSINESS HOURS | VEHICLE SIZE | NUMBER OF PEOPLE CAPABLE OF GETTING ON | PRESENT POSITION | APPEARANCE | MEETING VEHICLE |
|---|---|---|---|---|---|---|---|---|---|---|
| S001 | **** | RESTAURANT | PIZZA (T**1) | **** | 10:00-18:00 | W1, H1, D1 | 10 | X1, Y1, Z1 | **** | |
| S010 | **** | TEAROOM | SNACK (T**2) | **** | 11:00-20:00 | W1, H1, D1 | 10 | X2, Y2, Z2 | BBB-1 | ● |
| ⋮ | ⋮ | ⋮ | ⋮ | ⋮ | ⋮ | ⋮ | ⋮ | ⋮ | ⋮ | |
| Sn-3 | **** | FASHION | CLOTHES (Tn-1) | **** | 10:00-17:30 | W2, H2, D2 | 5 | Xn-1, Yn-1, Zn-1 | **** | |
| Sn-1 | **** | AMUSEMENT | KARAOKE (Tn-1) | **** | 13:00-21:00 | W3, H3, D3 | 20 | Xn, Yn, Zn | **** | |

FIG. 5

| DISPLAY TYPE | TIME ZONE | SCREEN IMAGE DATA |
|---|---|---|
| MEETING (SPRING) | -12:00 | AAA-1 |
| | 12:00-15:00 | AAA-2 |
| | 15:00-18:00 | AAA-3 |
| | 18:00- | AAA-4 |
| ... | ... | ... |
| SHOPPING A | -12:00 | GGG-1 |
| | 12:00-15:00 | GGG-2 |
| | 15:00-18:00 | GGG-3 |
| | 18:00- | GGG-4 |
| ... | ... | ... |

FIG. 6

INFORMATION SYSTEM, INFORMATION PROCESSING METHOD, AND PROGRAM

CROSS REFERENCE TO THE RELATED APPLICATION

This application claims the benefit of Japanese Patent Application No. 2018-033559, filed on Feb. 27, 2018, which is hereby incorporated by reference herein in its entirety.

BACKGROUND

Technical Field

The present disclosure relates to an information system, an information processing method, and a program for managing services provided by moving bodies which function for many purposes.

Description of the Related Art

Patent Literature 1 suggests that vehicles are utilized as mobile type shops and exhibition sites. It is assumed that a group of vehicles, which function as the mobile type shops or the like as described above, are allowed to gather in a predetermined region such as an open space or the like to provide a composite commercial facility such as a shopping mall. Such a composite commercial facility is composed of mobile vehicles (hereinafter referred to as "mobile shop vehicles" as well) which function as shops. Therefore, the composite commercial facility can be easily constructed at a place or in a region in which no shop exists. It is expected that the vacant lands may be effectively utilized in urban areas or suburbs and the provinces may be activated thereby.

Patent Literature

Patent Literature 1: Japanese Patent Application Laid-Open No. 2010-143558

SUMMARY

In the meantime, when the mobile shop vehicles gather to construct the composite commercial facility such as the shopping mall or the like, a problem is to secure a space which is usable, for example, as a meeting place for users, unlike any conventional shopping district constructed by fixed shops.

The present disclosure has been made taking the foregoing problem into consideration, an object of which is to provide a technique for securing a space which can be utilized as a meeting place in a composite commercial facility constructed by a plurality of mobile shop vehicles.

In order to achieve the object described above, one aspect of the present disclosure is exemplified as an information system. This information system comprises a selector configured to select one or more mobile shop vehicles each of which functions as a meeting place for users who utilize a shopping district composed of mobile shop vehicles, from a group of the mobile shop vehicles allowed to gather in a predetermined area in order to construct the shopping district composed of the mobile shop vehicles to provide services of different classifications in a composite manner; and a manager configured to instruct the one or more mobile shop vehicles each of which functions as the meeting place to cause a change into an appearance with which it is possible for the users to distinguish, in a differentiated manner, that each of the one or more mobile shop vehicles is the meeting place in the shopping district composed of the mobile shop vehicles.

According to the construction as described above, the space, which can be utilized as the meeting place by the users who utilize the mall, can be secured in the mall which is constructed at the predetermined destination by the group of the shop vehicles. The users, who utilize the mall, can distinguish the differentiated appearance having been subjected to the change and grasp that the shop vehicle is the meeting place set in the mall. When the shop vehicle is set as the meeting place, it is thereby possible to suppress, to the minimum, the influence exerted on the users by the weather including the cold, the heat, the rain, the wind, the snow, and the solar radiation caused in the outdoor environment in which the mall is constructed.

Further, in another aspect of the present disclosure, the manager may notify the one or more mobile shop vehicles each of which functions as the meeting place of appearance data for constructing the appearance with which it is possible for the users to distinguish, in the differentiated manner, that each of the one or more mobile shop vehicles is the meeting place in the shopping district composed of the mobile shop vehicles.

According to the construction as described above, the appearance, which has variations corresponding to the season, the period, and the regional environment for constructing the mall, can be constructed in the one or more mobile shop vehicles each of which functions as the meeting place.

Further, in still another aspect of the present disclosure, the information system may further comprise an acquirer configured to acquire position information, orientation information, and attribute information of the mobile shop vehicle for providing the service from each of the group of the mobile shop vehicles; wherein the manager may generate map information of the shopping district composed of the mobile shop vehicles including the one or more mobile shop vehicles each of which functions as the meeting place, on the basis of the position information, the orientation information, and the attribute information of the mobile shop vehicle for providing the service acquired from each of the group of the mobile shop vehicles, and a terminal of the user who utilizes the shopping district composed of the mobile shop vehicles may be notified of the map information.

According to the construction as described above, the map information, with which it is possible to graphically grasp the relative arrangement position of the mobile shop vehicle set as the meeting place, can be presented to the users who utilize the mall. The user can grasp the mobile shop vehicle set as the meeting place and select it as the joining place in the mall on the basis of the presented map information. Therefore, it is possible to improve the usability for the users who utilize the mall.

Further, in still another aspect of the present disclosure, the manager may generate joining instructions for allowing a first mobile shop vehicle included in the one or more mobile shop vehicles each of which functions as the meeting place and a second mobile shop vehicle included in the one or more mobile shop vehicles each of which functions as the meeting place to join in the predetermined area.

According to the construction as described above, the mobile shop vehicles, each of which mutually functions as the meeting place, can move so that they join in the predetermined area in which the mall is constructed. On this account, for example, the users, who mutually get on the different mobile shop vehicles, can join while avoiding the influence exerted by the weather including, for example, the cold, the heat, the rain, the wind, the snow, and the solar radiation caused in the outdoor environment. It is possible to provide the service for allowing the users who utilize the mall to join in the state in which the influence of the weather in the outdoor environment is avoided as far as possible.

Further, in still another aspect of the present disclosure, the manager may generate a joining instruction for moving the first mobile shop vehicle via a point of the second mobile shop vehicle positioned in the predetermined area.

According to the construction as described above, the user, who gets on the first mobile shop vehicle, can join with the user who gets on the second mobile shop vehicle, while admiring the situation of the mall in the vicinity of the movement route.

Further, in still another aspect of the present disclosure, the one or more mobile shop vehicles each of which functions as the meeting place may provide an advertisement of the shopping district composed of the mobile shop vehicles and a free sample of the service provided in the shopping district composed of the mobile shop vehicles, to the users who utilize the shopping district composed of the mobile shop vehicles.

According to the construction as described above, it is possible to appeal to the users for the contents of various services provided by the mall constructed by the group of the mobile shop vehicles.

Further, still another aspect of the present disclosure is exemplified as an information processing method executed by a computer of an information system. This information processing method comprises allowing a computer to execute a selecting step of selecting one or more mobile shop vehicles each of which functions as a meeting place for users who utilize a shopping district composed of mobile shop vehicles, from a group of the mobile shop vehicles allowed to gather in a predetermined area in order to construct the shopping district composed of the mobile shop vehicles to provide services of different classifications in a composite manner; and a managing step of instructing the one or more mobile shop vehicles each of which functions as the meeting place to cause a change into an appearance with which it is possible for the users to distinguish, in a differentiated manner, that each of the one or more mobile shop vehicles is the meeting place in the shopping district composed of the mobile shop vehicles.

Further, still another aspect of the present disclosure is exemplified as a program executed by a computer of an information system. This program allows a computer to execute a selecting step of selecting one or more mobile shop vehicles each of which functions as a meeting place for users who utilize a shopping district composed of mobile shop vehicles, from a group of the mobile shop vehicles allowed to gather in a predetermined area in order to construct the shopping district composed of the mobile shop vehicles to provide services of different classifications in a composite manner; and a managing step of instructing the one or more mobile shop vehicles each of which functions as the meeting place to cause a change into an appearance with which it is possible for the users to distinguish, in a differentiated manner, that each of the one or more mobile shop vehicles is the meeting place in the shopping district composed of the mobile shop vehicles.

Note that the present disclosure can be grasped as an information system or an information processing apparatus including at least a part of the processes and the units described above. Further, the present disclosure can be grasped as an information processing method for executing at least a part of the processes performed by the units described above. Further, the present disclosure can be grasped as a computer-readable storage medium which stores a computer program for allowing a computer to execute the information processing method. The processes and the units described above can be carried out while being freely combined with each other, as long as any technical contradiction or inconsistency is not caused.

According to the present disclosure, it is possible to provide the technique for securing the space which can be utilized as the meeting place in the composite commercial facility constructed by the plurality of mobile shop vehicles.

BRIEF DESCRIPTION OF THE DRAWINGS

FIG. 4 explains vehicle management information.

FIG. 5 explains shop management information.

FIG. 6 explains screen image data management information.

DETAILED DESCRIPTION

An explanation will be made below with reference to the drawings about a mobile shop management system according to an embodiment. The construction or configuration of the embodiment described below is shown by way of example, and the mobile shop management system of the present disclosure is not limited to the construction or configuration of the embodiment.

1. System Configuration

Figure 1:
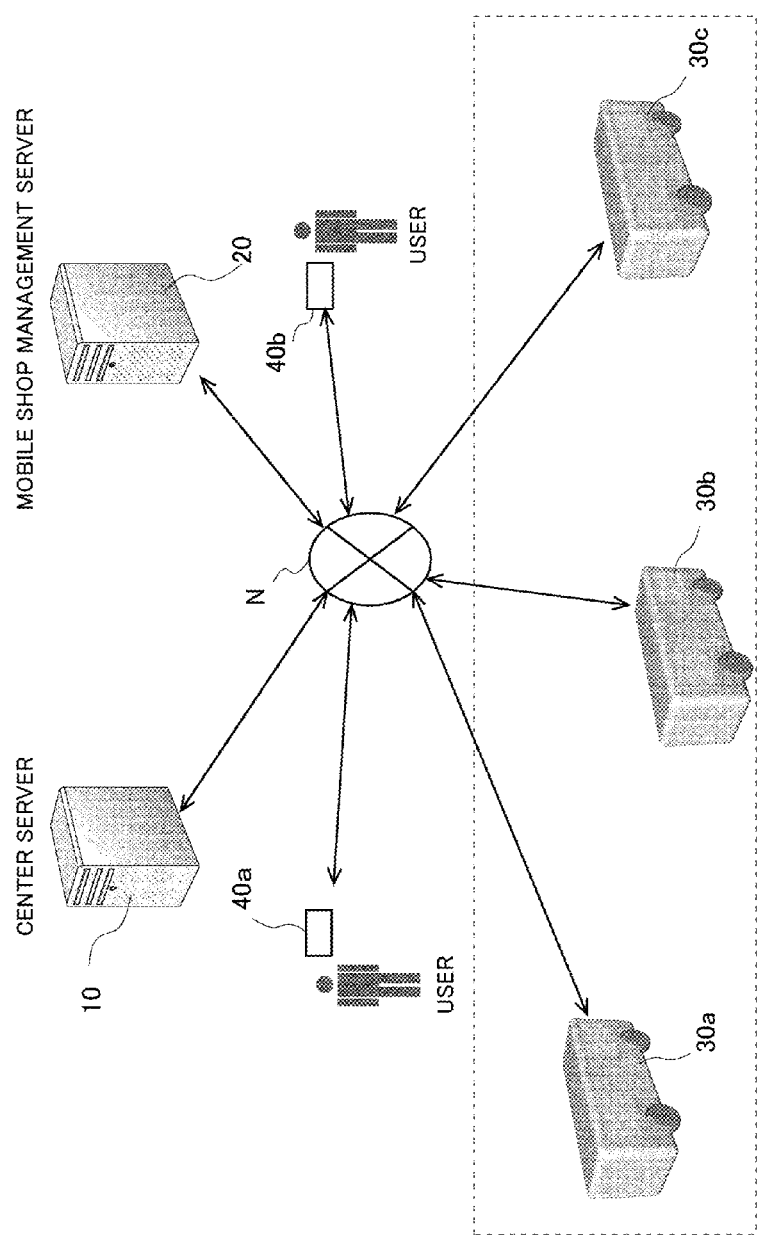
FIG. 1 illustrates a schematic arrangement of a moving body system to which a mobile shop management system according to an embodiment is applied.

FIG. 1 illustrates a schematic arrangement of a moving body system to which a mobile shop management system according to this embodiment is applied. The mobile shop management system 1 according to this embodiment functions as a part of the moving body system or a complement system which cooperates with the moving body system.

At first, an outline of the moving body system will be explained. The moving body system is constructed to include a plurality of autonomous traveling vehicles 30a, 30b, 30c which perform the autonomous traveling on the basis of given commands, and a center server 10 which issues the commands. In the following description, the autonomous traveling vehicle is simply referred to as "vehicle" as well, and the plurality of autonomous traveling vehicles 30a, 30b, 30c are collectively referred to as "vehicles 30" as well.

The vehicle 30 is an automatic driving vehicle which provides a predetermined mobility service in accordance with various needs of customers (hereinafter referred to as "users" as well), and the vehicle 30 is a vehicle which can perform the autonomous traveling on the road. For example, a self-propelled electrically-powered vehicle, which is referred to as "Electric Vehicle (EV) Pallet", is exemplified as the vehicle 30 capable of the autonomous traveling which constructs the moving body system. The vehicle 30 is a multipurpose moving body which can change the exterior decoration and the interior decoration of the subject vehicle and which can arbitrarily select the vehicle size depending on the way of use and the purpose of the mobility service to be provided. The vehicle 30 provides, for example, the predetermined mobility service including, for example, the movement of the user, the transport of the cargo, and the selling of commercial products to the user depending on the need of any arbitrary user or the user who uses the system via each of user terminals 40a, 40b. Further, the center server 10 is an apparatus which manages the plurality of vehicles 30 for constructing the moving body system. The center server 10 issues the operation commands with respect to the respective vehicles 30. Each of the user terminals 40a, 40b exemplified in FIG. 1 is a small-sized computer including, for example, smartphone, mobile phone, tablet terminal, personal information terminal, and wearable computer (smartwatch or the like). However, the user terminal 40a, 40b may be PC (Personal Computer) which is connected to the center server 10 and/or a shop vehicle management server 20 via the network N. The user terminals 40a, 40b are hereinafter collectively referred to as "user terminals 40" as well.

In the moving body system exemplified in FIG. 1, the center server 10, the vehicles 30, and the user terminals 40 are connected to one another by the network N. Further, the shop vehicle management server 20 (hereinafter simply referred to as "management server 20" as well), which constitutes the mobile shop management system 1 of this embodiment, is connected to the network N. The network N includes public networks such as the internet or the like, wireless networks such as the mobile phone network, exclusive networks such as VPN (Virtual Private Network) or the like, and networks such as LAN (Local Area Network) or the like. A plurality of other unillustrated center servers 10, vehicles 30, user terminals 40, and management servers 20 may be connected to the network N.

In the moving body system to which the mobile shop management system 1 according to this embodiment is applied, the vehicles 30a, 30b, 30c function, for example, as mobile type shop vehicles (vehicles 30, which function as shops, are hereinafter referred to as "shop vehicles 30" as well) which are provided for the purpose of selling commercial products and/or providing labors/services with respect to users. The shop vehicle 30 has, for example, the facility and the equipment for the shop business in the vehicle. Then, the shop vehicles 30 move to and gather at a predetermined destination including, for example, urban or suburban open spaces and provincial predetermined regions, and the shop vehicles 30 develop, for example, the facilities and the equipment included in the respective vehicles. Thus, the shop vehicles 30 construct a composite commercial facility such as a shopping mall or the like. The composite commercial facility, which is formed by a group of the shop vehicles allowed to gather at the predetermined destination, can be easily constructed at the place or in the region in which no shop exists. Therefore, it is expected to effectively utilize, for example, urban vacant lands and suburban vacant lands and activate provincial regions.

Note that the destination, at which the shop vehicles 30 gather, may include those located on the road. Further, the destination may include shops (fixed shops and mobile type shops other than vehicles) other than the shop vehicles 30. Further, it is not necessarily indispensable that the shop vehicle 30 is unmanned. For example, a personnel for business, a personnel for serving customers, and/or a personnel for security, who provides services to the user who utilizes the selling of the commercial product and the labor/service dealt with by the shop vehicle 30, may get on the shop vehicle 30. Further, it is not necessarily indispensable that the shop vehicle 30 always performs the autonomous traveling. For example, the shop vehicle 30 may be such a vehicle that the personnel as described above performs the driving or the personnel as described above assists the driving depending on the situation. Note that FIG. 1 exemplifies the three shop vehicles (vehicles 30a, 30b, 30c). However, a plurality of shop vehicles 30 are included in the moving body system. The shop vehicle 30 is an example of the "mobile shop vehicle".

Figure 2:
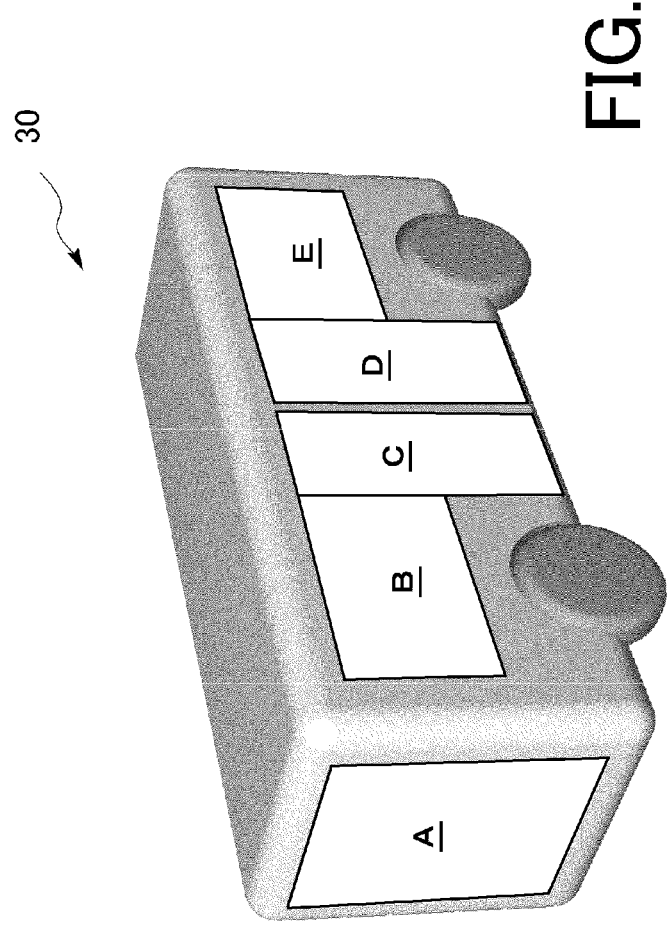
FIG. 2 illustrates an exemplary appearance of a shop vehicle.

FIG. 2 illustrates an example of the appearance of the shop vehicle 30 according to this embodiment. As indicated by A to E in FIG. 2, external displays, which can output arbitrary screen images (images or pictures), are provided on the outer wall of the vehicle body for constructing the shop vehicle 30. The external display may be either a liquid crystal display such as LCD (Liquid Crystal Display) or the like or an organic EL (Electro-Luminescence) display. Further, the external display may be constructed, for example, by an LED (Light Emitting Diode) matrix. The shop vehicle 30, which is provided with the external display on the outer wall, can change the appearance of the subject vehicle, for example, by changing or switching the screen image or the like displayed on the display. Note that in the case of the shop vehicle 30 exemplified in FIG. 2, the direction, which is opposed to the external display A, is the vehicle orientation which represents the direction of the shop vehicle 30. The vehicle orientation is specified by the orientation information described later on.

The mobile shop management system 1 according to this embodiment has the configuration including the shop vehicles 30 and the management server (shop vehicle management server) 20. In the case of the mobile shop management system 1 according to this embodiment, the management server 20 manages the gathering state of the group of the shop vehicles allowed to gather so that the composite commercial facility (composite commercial facility is hereinafter simply referred to as "mall" as well) is constructed at the predetermined destination. As described later on, the management server 20 acquires, for example, the position information, the orientation information, and the shop information from the shop vehicle 30, and the management server 20 manages the gathering state of the group of the shop vehicles allowed to gather at the predetermined destination. Then, the management server 20 selects at least one or more shop vehicles 30 from the group of the shop vehicles allowed to gather at the predetermined destination so that the mall is constructed, on the basis of the gathering state of the group of the shop vehicles, and the management server 20 sets the selected one or more shop vehicles 30 as the meeting place or meeting places for the users who utilize the services provided in the mall. The shop vehicle 30, which is selected as the meeting place, is notified of an instruction to the effect that the concerning shop vehicle 30 functions as the meeting place, via the network N from the management server 20. The "mall", which is constructed by the group of the shop vehicles, is an example of the "shopping district composed of mobile shop vehicles". Further, each of the "one or more shop vehicles", which is selected as the meeting place from the group of the shop vehicles, is an example of the "one or more mobile shop vehicles each of which functions as a meeting place".

The shop vehicle 30, which has received the foregoing notification from the management server 20, contemplates the differentiation with respect to the other shop vehicles 30 so that the user can recognize that the subject vehicle is the meeting place of the group of the shop vehicles. For example, the shop vehicle 30, which has received the notification, changes the display contents of the appearance outputted to the external display provided on the outer wall of the vehicle body. For example, a message, which indicates that the subject vehicle is the meeting place of the mall, is displayed. Further, it is also allowable to display messages including, for example, keywords and names of the users who mutually utilize the subject vehicle as the meeting place. The names and the keywords of the mutual users, which are displayed on the appearance as the messages, may be either accepted, for example, by the shop vehicle 30 via the user terminal 40 or accepted by the management server 20. Further, the shop vehicle 30, which has received the notification, makes the change into the screen image data which makes it possible to distinguish that the subject vehicle is the meeting place of the mall (for example, a screen image of gathered characters of an animation or the like or a merry-go-round).

The user, who utilizes the mall, can grasp that the concerning shop vehicle is the meeting place of the mall by visually recognizing, for example, the message and/or the screen image data displayed on the external display of the shop vehicle 30. Note that the predetermined screen image data, which includes the message outputted to the external display as described above, may be retained by the shop vehicle 30 which is set as the meeting place, or the predetermined screen image data may be retained by the management server 20. When the message is displayed, for example, a screen image data, which serves as a model or template, may be previously retained. A predetermined message may be superimposed on the screen image data of the model or template so that the predetermined message may be displayed. It is appropriate that the predetermined screen image data described above is used in a limited manner for the shop vehicle 30 which has received the instruction/notification in relation to the meeting place, at least in the mall. Further, if the illumination of electric spectaculars or the like is included in the exterior decoration and/or the interior decoration of the shop vehicle 30, it is also appropriate to effect the differentiation with respect to the other shop vehicles 30 by changing, for example, the color classification, the brightness (luminance), and/or the blinking pattern of the illumination. As for the shop vehicle 30 set as the meeting place, the differentiation is contemplated with respect to the other shop vehicles 30 by making the change into the appearance of the display content to indicate that the subject vehicle is meeting place in the mall. The "screen image data", which is outputted to the external display, is an example of the "appearance data for constructing the appearance".

As for the shop vehicle 30 which is set as the meeting place, for example, the content of the shop service provided by the subject vehicle is changed into the service content provided to function as the meeting place. For example, the shop vehicle 30, which is set as the meeting place, functions to advertise the mall and/or provide, for example, discount coupons and/or free samples of commercial products dealt with by the group of the shop vehicles for constructing the mall with respect to the users who utilize the concerning shop vehicle 30. The shop vehicle 30, which provides the service as described above as the meeting place, may be previously decided while being distinguished from the other shop vehicles 30 for the shop businesses. The management server 20 may select the shop vehicle 30 capable of being utilized as the meeting place from the plurality of shop vehicles 30 which provide the services as described above, for example, in accordance with the scale of the construction of the mall and/or the number and the quantity of the group of the shop vehicles allowed to gather. In the case of the mobile shop management system 1 according to this embodiment, it is possible to secure the space which can be utilized as the meeting place in the mall constructed at the predetermined destination by the group of the shop vehicles. Further, when the shop vehicle 30 is set as the meeting place, for example, it is thereby possible to suppress, to the minimum, the influence exerted by the weather including the cold, the heat, the rain, the wind, the snow, and the solar radiation caused in the outdoor environment in which the mall is constructed.

Further, in the mobile shop management system 1 according to this embodiment, the management server 20 may generate a map in the mall including the shop vehicle 30 which is set as the meeting place, and the management server 20 may present the map to the user. The map is presented to the user terminal 40 of the user in response to the request of the user who utilizes the mall. For example, the users, who mutually have the user terminals 40a, 40b, can make reference to the map presented onto the display devices of the respective user terminals 40, and the users can utilize the shop vehicle 30 which is set as the meeting place, as the joining place in the mall. In the case of the mobile shop management system 1, it is possible to improve the usability for the users who utilize the mall, by presenting the map in the mall including the shop vehicle 30 which is set as the meeting place.

Further, in the case of the mobile shop management system 1 according to this embodiment, if the management server 20 sets a plurality of the shop vehicles 30 which function as the meeting places in the mall, the management server 20 may move the shop vehicles 30. Note that the operation commands concerning the movement in the mall, which are issued to the shop vehicles 30, are given by the aid of the center server 10. For the purpose of explanation, it is now assumed that the shop vehicles, which are set as the meeting places, are referred to as "meeting vehicles". It is assumed that three meeting vehicles 30A, 30B, 30C are set in the mall. It is assumed that the respective meeting vehicles are positioned at different positions in the mall respectively.

The management server 20 selects one meeting vehicle (for example, the meeting vehicle 30A), for example, from the three meeting vehicles 30A, 30B, 30C. Then, the management server 20 moves the selected meeting vehicle 30A in the mall, for example, such that the meeting vehicle 30A arrives at the point at which the meeting vehicle 30C is positioned via the point at which the meeting vehicle 30B is positioned. In this way, when one (meeting vehicle 30A) of the plurality of meeting vehicles set as the meeting places is appropriately moved, the users, who mutually get on the respective meeting vehicles, can thereby join at the points at which the meeting vehicles 30B, 30C are positioned in the mall, while avoiding the influence exerted by the weather including, for example, the cold, the heat, the rain, the wind, the snow, and the solar radiation caused in the outdoor environment in which the mall is constructed. After joining with the meeting vehicle 30C, the meeting vehicle 30A is moved to the point in the mall provided before the movement.

The form, in which one vehicle is selected from the plurality of meeting vehicles to move the vehicle, has been explained above. However, for example, it is also allowable that the management server 20 moves the three meeting vehicles 30A, 30B, 30C respectively to join at a predetermined point in the mall instructed by the management server 20. Even in the case of the form of movement as described above, the users, who mutually get on the different meeting vehicles 30, can join in such a state that the influence of the weather in the outdoor environment in which the mall is constructed is avoided as far as possible.

The center server 10 cooperates with the management server 20 to command the operation concerning the joining in the mall with respect to the meeting vehicles 30A, 30B, 30C. The center server 10 accepts, for example, from the management server 20, the joining instruction so that the meeting vehicle 30A is moved to the point at which the meeting vehicle 30C is positioned via the point at which the meeting vehicle 30B is positioned. The center server 10 acquires, for example, the position information of the meeting vehicles 30A, 30B, 30C. Then, the center server 10 specifies the movement route in which the departure point is the point at which the meeting vehicle 30A is positioned and the destination point after the movement is the departure point again via the point at which the meeting vehicle 30B is positioned and the point at which the meeting vehicle 30C is positioned. Then, the center server 10 transmits the operation command to the effect that "move from the departure point to the destination point" with respect to the meeting vehicle 30A. Accordingly, the center server 10 can allow the meeting vehicle 30A to join by executing the traveling along the predetermined route starting from the present point to travel via the points at which the meeting vehicles 30B, 30C are positioned.

Note that the operation command may include commands for the meeting vehicle 30A in order to provide, to the user, predetermined services including, for example, "temporarily stop at predetermined points (for example, points at which the meeting vehicles 30B, 30C are positioned)" and "allow the user to get on/off", in addition to the command to instruct the traveling. Further, it is also allowable to include commands for the meeting vehicle 30A which is moving to perform the presentation on the external display to the effect that the meeting vehicle 30 is moving and/or the lightening and/or the blinking of the illumination in order to prompt the call for attention of the user in the mall.

The same or equivalent procedure is also adopted when the three meeting vehicles 30A, 30B, 30C are moved to join respectively. The center server 10 may specify the joining point in the mall and the movement route in which the joining point is the destination, after acquiring the position information of the respective meeting vehicles, and the center server 10 may transmit, to the respective meeting vehicles, operation commands to the effect that "move from the present point to the destination point".

2. Configuration of Apparatuses and Devices

Figure 3:
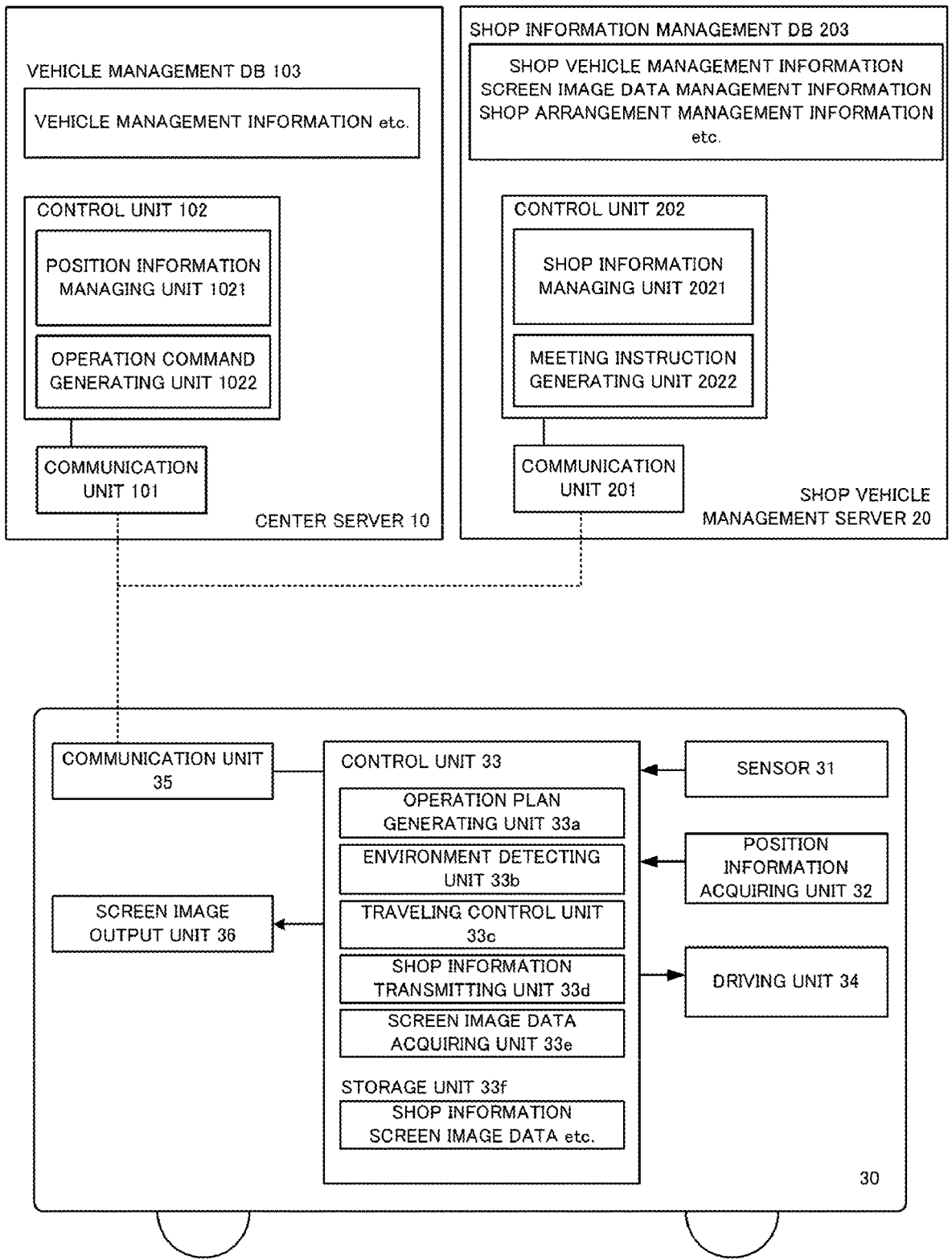
FIG. 3 illustrates schematic arrangements of a vehicle, a center server, and a management server.

FIG. 3 illustrates schematic arrangements of the vehicle 30, the center server 10, and the management server 20 exemplified in FIG. 1. An explanation will be made on the basis of FIG. 3 about the hardware configuration and the functional configuration of the vehicle 30, the center server 10, and the management server 20. Note that it is assumed that the vehicle 30 functions as each of the shop vehicles 30a, 30b, 30c.

The vehicle 30 is the vehicle which travels in accordance with the operation command acquired from the center server 10. Specifically, the vehicle 30 generates the traveling route on the basis of the operation command acquired via the network N, and the vehicle 30 travels on the road by means of a method adequate for the autonomous traveling while performing the sensing around the vehicle 30. The vehicle 30 is constructed to include a sensor 31, a position information acquiring unit 32, a control unit 33, a driving unit 34, a communication unit 35, and a screen image output unit 36. The vehicle 30 is operated by the electric power which is supplied, for example, from an unillustrated battery. However, the vehicle 30 may be a vehicle which carries an engine driven by liquid fuel such as gasoline or the like. Alternatively, the vehicle 30 may be a vehicle which is operated by the electric power or the like generated by using the liquid fuel or the like.

The sensor 31 senses the state of the vehicle 30 and the surroundings of the vehicle in order to acquire the information required for the autonomous traveling of the vehicle 30. The sensor 31 for sensing the state of the vehicle 30 is exemplified, for example, by an acceleration sensor, a speed sensor, and an azimuth angle sensor. The sensor 31 for sensing the surroundings of the vehicle 30 is exemplified, for example, by a stereo camera, a visible light camera, a laser scanner, LIDAR (Light Detection and Ranging, Laser Imaging Detection and Ranging), and a radar. The information, which is acquired by the sensor 31, is transmitted to the control unit 33, and the information is utilized by the control unit 33 in order to recognize, for example, the cruising lane (driving lane) and the obstacles existing around the vehicle 30.

The position information acquiring unit 32 acquires the present position of the vehicle 30. Typically, the position information acquiring unit 32 is constructed to include, for example, a GPS (Global Positioning System) receiver. The information (for example, the latitude, the longitude, and the altitude), which is acquired by the position information acquiring unit 32, is transmitted to the control unit 33, and the information is utilized for predetermined processes including, for example, the calculation of the route for allowing the vehicle to arrive at the destination by using the present position of the vehicle 30. Further, the information, which is acquired by the position information acquiring unit 32, is transmitted via the communication unit 35 to the center server 10 and/or the management server 20 connected to the network N periodically or in response to the request of each of the servers.

The control unit 33 is a computer which performs the control of the vehicle 30 on the basis of the information acquired from the sensor 31 and the position information acquiring unit 32. The control unit 33 is constructed, for example, by a microcomputer and a storage unit 33f (for example, ROM (Read Only Memory)) for storing various programs and various pieces of data. CPU (Central Processing Unit) of the microcomputer executes the various programs and the like, and thus the functions are realized to perform the various processes described above. As specified examples of the various processes, the control unit 33 has functional modules of an operation plan generating unit 33a, an environment detecting unit 33b, a traveling control unit 33c, a shop information transmitting unit 33d, and a screen image data acquiring unit 33e.

The operation plan generating unit 33a acquires the operation command from the center server 10, and the operation plan generating unit 33a generates the operation plan of the subject vehicle. The information, which relates to the departure place and the destination instructed to the vehicle 30, is included in the operation command. Therefore, the operation plan generating unit 33a calculates the route along which the vehicle 30 is to advance, and the operation plan generating unit 33a generates the operation plan, on the basis of the destination given from the center server 10 and the position of the subject vehicle obtained from the position information acquiring unit 32. The operation plan includes the data which relates to the route along which the vehicle 30 travels as calculated as described above and the data which defines the process to be performed by the vehicle 30 on a part or all of the route. The data, which is included in the operation plan, is exemplified, for example, by those described in (1) and (2) as follows.

(1) Data in which route for allowing subject vehicle to travel is represented by set of road links The route, on which the subject vehicle travels, may be automatically generated, for example, on the basis of the instructed departure place and the destination by making reference to the map data stored in the storage unit 33f. Note that the calculation of the route for allowing the subject vehicle to travel may rely on any process of an external apparatus (for example, the center server 10) without using any internal apparatus of the vehicle 30. In this case, the center server 10 acquires the position of the subject vehicle from the vehicle 30, and the center server 10 calculates the route along which the vehicle 30 should advance. Further, the calculated route data may be either included in the operation command described above or transmitted to the vehicle 30 distinctly. (2) Data which represents process to be performed by subject vehicle at any point on route The process, which is to be performed by the subject vehicle, includes, for example, "temporarily stop" and "allow user to get on or get off vehicle 30". However, there is no limitation thereto. The operation plan, which is generated by the operation plan generating unit 33a, is transmitted to the traveling control unit 33c described later on.

The environment detecting unit 33b detects the environment around the vehicle 30 required for the autonomous traveling, on the basis of the data acquired by the sensor 31. The detection target is, for example, the number and the position(s) of the lane(s), the number and the position(s) of the vehicle(s) existing around the subject vehicle, the number and the position(s) of the obstacle(s) existing around the subject vehicle (for example, pedestrian, bicycle, structure, and building), the structure of the road, and the road sign. However, there is no limitation thereto. The detection target may be anyone provided that the target is required to perform the autonomous traveling. For example, when the sensor 31 is a stereo camera, the object existing around the vehicle 30 is detected by performing the image processing for the image data picked up thereby. Further, the environment detecting unit 33b not only merely detects the object existing around the vehicle 30, but the detected object may be also subjected to the tracking (detected object is continuously detected successively). For example, it is possible to determine the relative velocity of the object from the difference between the coordinates of the object detected one step before and the present coordinates of the object. The data relevant to the environment around the vehicle 30 (hereinafter referred to as "environment data"), which is detected by the environment detecting unit 33b, is transmitted to the traveling control unit 33c described later on. Note that the orientation information of the subject vehicle, which is acquired by the aid of the sensor 31, is transmitted via the communication unit 35 to the center server 10 and the management server 20 connected to the network N periodically or in response to the request of each of the servers.

The traveling control unit 33c generates the control command in order to control the autonomous traveling of the subject vehicle on the basis of the operation plan generated by the operation plan generating unit 33a, the environment data generated by the environment detecting unit 33b, and the position information of the subject vehicle acquired by the position information acquiring unit 32. For example, the traveling control unit 33c generates the control command in order to allow the subject vehicle to travel so that the subject vehicle travels along a predetermined route and any obstacle does not enter a predetermined safe area around the center of the subject vehicle. The generated control command is transmitted to the driving unit 34 described later on. As for the method for generating the control command for allowing the vehicle to perform the autonomous traveling, it is possible to adopt any known method.

The shop information transmitting unit 33d transmits the shop information of the subject vehicle stored in the storage unit 33f via the communication unit 35 to the management server 20 connected to the network N periodically or in response to the request of the management server 20. The vehicle ID, which is used to unambiguously identify or distinguish the vehicle 30, is added to the shop information transmitted to the management server 20. As explained with reference to FIG. 5, the shop information includes, for example, "name of shop", "type of service to be provided", "dealing commercial product", "dealer ID", "business hours", "vehicle size", "number of people capable of getting on", and "screen image data information for constructing appearance". The "shop information" is an example of the "attribute information of the mobile shop vehicle for providing the service".

The screen image data acquiring unit 33e acquires, via the communication unit 35, the screen image data transmitted from the management server 20, and the screen image data acquiring unit 33e stores the screen image data in the storage unit 33f. The screen image data, which is transmitted from the management server 20, includes, for example, moving images, still images, and display messages. Note that if the illumination of electric spectaculars or the like is included in the exterior decoration and/or the interior decoration of the vehicle 30, the screen image data includes the instruction information to instruct, for example, the color classification, the brightness (luminance), and/or the blinking pattern of the illumination.

The driving unit 34 allows the vehicle 30 to travel on the basis of the control command generated by the traveling control unit 33c. The driving unit 34 is constructed to include, for example, a motor for driving wheels, an inverter, a brake, and a steering mechanism. For example, the motor and the brake are driven in accordance with the control command, and thus the autonomous traveling of the vehicle 30 is realized. Further, the communication unit 35 connects the vehicle 30 to the network N. The communication unit 105 can make communication with other apparatuses (for example, the center server 10 and the management server 20) via the network N by utilizing, for example, the mobile communication service such as 3G (3rd Generation), LTE (Long Term Evolution) or the like.

The screen image output unit 36 outputs the screen image, for example, to the external displays (exemplified by A to E in FIG. 2) provided on the outer wall of the vehicle body. In this embodiment, the screen image data, which is stored in the storage unit 33f, is displayed on the external display to construct the appearance. The vehicle 30 can change the appearance of the subject vehicle by displaying the screen image data transmitted from the management server 20 on the external display, and the vehicle 30 can allow the user to recognize that the concerning vehicle is the meeting place included in the group of the shop vehicles. Note that if the vehicle 30 includes the illumination of electric spectaculars or the like in the exterior decoration and/or the interior decoration, the color classification, the brightness (luminance), and/or the blinking pattern of the illumination is/are changed or switched in accordance with the screen image data.

Next, the center server 10 will be explained. The center server 10 is the apparatus which manages the autonomous traveling of the plurality of vehicles 30 for constructing the moving body system and which transmits the operation commands to the respective vehicles. The center server 10 cooperates with the management server 20 to generate the operation commands with respect to the shop vehicles 30a, 30b, 30c for constructing the mall. The center server 10 is configured by a general computer having a processor such as CPU, DSP (Digital Signal Processor) and the like, a main storage device such as RAM (Random Access Memory), ROM and the like, and an auxiliary storage device such as EPROM (Erasable Programmable ROM), hard disk drive (HDD, Hard Disk Drive), removable media and the like. The removable media include USB (Universal Serial Bus) memory and disk recording media such as CD (Compact Disc) and DVD (Digital Versatile Disc). Further, the center server 10 may be provided with an input device such as a mouse, a keyboard and the like, and an output device such as a display, a printer and the like. However, the center server 10 may be a single computer, or the center server 10 may be a system configured by an assembly of a plurality of computers such as the cloud or the like. The center server 10 reads and executes the operating system (Operating System: OS), various programs, various tables and the like stored in the auxiliary storage device, on the working area of the main storage device. The center server 10 realizes the function which conforms to the predetermined purpose by controlling, for example, the respective constitutive parts by means of the execution of the program.

The center server 10 has a communication unit 101, a control unit 102, and a vehicle management DB (database) 103 configured in the auxiliary storage device. The communication unit 101 is a communication interface with respect to the network N. For example, a LAN interface board and a wireless communication circuit for the wireless communication are exemplified as the communication interface.

The control unit 102 is an information processing function which is provided by the execution of the program by the processor. The information processing function, which manages the autonomous traveling of the plurality of vehicles 30 for constructing the moving body system and which transmits the operation commands to the respective vehicles, is provided by the control unit 102. The control unit 102 includes at least a position information managing unit 1021 and an operation command generating unit 1022. Note that the series of processes executed by the center server 10 can be executed by the hardware, but the processes can be executed by the software as well.

The position information managing unit 1021 collects the position information (for example, the latitude and the longitude) from the plurality of vehicles 30 which are managed by the center server 10, and the position information managing unit 1021 manages the position information. In this embodiment, the position information managing unit 1021 receives the position information which is provided at the present point in time and which is transmitted from the vehicles 30 for constructing the mall at predetermined cycle intervals, and the position information managing unit 1021 stores the received position information in the vehicle management DB 103.

The operation command generating unit 1022 receives the notification of the information of the vehicle as the joining target in the mall, from the cooperating management server 20, and the operation command generating unit 1022 generates the operation command with respect to the concerning vehicle. The notification of the joining target received from the management server 20 includes the information in relation to the shop vehicle 30 (for example, the shop vehicles 30a, 30b, 30c) selected as the meeting place from the group of the shop vehicles. The operation command generating unit 1022 acquires the position information of the shop vehicles 30a, 30b, 30c in the mall at the present point in time. Then, the operation command generating unit 1022 makes reference, for example, to the map data stored, for example, in the auxiliary storage device to specify the movement route in which the departure place is the point at which the shop vehicle 30a is positioned to travel via the points (joining points) at which the shop vehicles 30a, 30b are positioned and return to the point provided before the movement. The operation command generating unit 1022 generates the operation command to travel from the vehicle position provided at the present point in time to the joining point, with respect to the shop vehicle 30a. Note that the operation command includes, for example, the instruction at the joining point for the users who utilize the respective shop vehicles as the meeting places in the mall.

Further, the operation command generating unit 1022 designates, for example, as the departure place, the point at which each of the shop vehicles in the mall is positioned to specify the points (destinations) in the mall at which the shop vehicles 30a, 30b, 30c can park and stop for the purpose of the joining. Then, the operation command generating unit 1022 generates the operation commands to travel from the vehicle positions provided at the present point in time to the joining point with respect to the respective shop vehicles 30. The operation commands include, for example, the instructions at the joining point for the users who utilize the respective shop vehicles as the meeting places in the mall.

Note that the form of movement upon the joining in the mall, which is generated for each of the shop vehicles by the operation command generating unit 1022 described above, is described by way of example, and it is also allowable to adopt any other form of movement. It is enough that each of the shop vehicles, which is set as the meeting place, can move in the mall to join.

The vehicle management information in relation to the plurality of vehicles 30 to perform the autonomous traveling is stored in the vehicle management DB 103. FIG. 4 explains the vehicle management information configured as a table. As indicated in FIG. 4, the vehicle management information has respective fields of "movement management region", "vehicle ID", "classification of way of use", "dealer ID", "base ID", "present position", and "operation situation". The information, which is provided to specify the movement region for each of the vehicles to provide the service, is stored in the movement management region. The movement management region may be either the information which indicates, for example, city, ward, town, village or the like, or the movement management region may be the information which specifies the area comparted by the latitude and the longitude. The identification information, which is provided to unambiguously identify the vehicle 30 managed by the center server 10, is stored in the vehicle ID. The information, which specifies the classification of way of use of the service provided by each of the vehicles, is stored in the classification of way of use. "Shop" is stored in the case of the vehicle 30 which has the purpose of selling the commercial product and/or providing the labor/service, "passenger transport" is stored in the case of the vehicle 30 which provides the movement service to the user, and "collection/delivery" is stored in the case of the vehicle 30 which provides the collection/delivery service of the cargo or the like to the user. The identification information, which unambiguously identifies the dealer who provides the selling of the commercial product and/or the labor/service by utilizing the vehicle 30, is stored in the dealer ID. Typically, the dealer ID is the business establishment code allotted to the dealer. The identification information, which identifies the place to serve as the base for the vehicle 30, is stored in the base ID. The vehicle 30 departs from the base place identified by the base ID, and the vehicle 30 returns to the base place after the termination of the provision of the service in the movement management region. The position information (latitude, longitude), which is acquired by the aid of the position information acquiring unit 32 of each of the vehicles 30, is stored in the present position. The position information is updated when the position information transmitted from each of the vehicles 30 is received. The status information, which indicates the operation situation of the vehicle 30, is stored in the operation situation. For example, if the vehicle 30 is providing the movement service based on the autonomous traveling, "in the middle of operation" is stored. If the vehicle 30 is not providing the movement service, "pause" is stored.

Next, the management server 20 will be explained. The management server 20 is a computer which manages the gathering state of the shop vehicles 30 allowed to gather so that the mall is constructed. The management server 20 is the general computer having the same or equivalent configuration as that of the center server 10. Therefore, any explanation thereof is omitted. The management server 20 may be also composed of a single computer, or the management server 20 may be a system configured by an assembly of a plurality of computers such as the cloud or the like as well. The management server 20 reads and executes OS, various programs, various tables and the like stored in the auxiliary storage device, on the working area of the main storage device. The management server 20 realizes the function which conforms to the predetermined purpose by controlling, for example, the respective constitutive parts by means of the execution of the programs.

The management server 20 has a communication unit 201, a control unit 202, and a shop information management DB 203 configured in an auxiliary storage device. The communication unit 201 is the same as or equivalent to the communication unit 101, and hence any explanation thereof is omitted. The management server 20 acquires the position information and the orientation information of the respective shop vehicles which construct the mall and which are connected to the network N via the communication unit 201. The position information of each of the vehicles is specified by the position information acquiring unit 32, and the orientation information is specified by the environment detecting unit 33*b*. Similarly, the management server 20 acquires the shop information from each of the shop vehicles which construct the mall via the communication unit 201. The shop information of each of the vehicles is transmitted from the shop information transmitting unit 33*d*. Further, the management server 20 notifies the cooperating center server 10 via the communication unit 201 of the instruction in relation to the joining with the respective shop vehicles set as the meeting vehicles.

The control unit 202 is an information processing function provided by the execution of the program by the processor of the management server 20. The gathering state of the group of the shop vehicles allowed to gather so that the mall is constructed is managed by the control unit 202. The control unit 202 provides the information processing function to set the shop vehicle 30 which functions as the meeting place for the users who utilize the mall, from the group of the shop vehicles. The control unit 202 includes at least a shop information managing unit 2021 and a meeting instruction generating unit 2022. Note that the series of processes executed by the management server 20 can be executed by the hardware, but the processes can be executed by the software as well.

The shop information managing unit 2021 collects and manages the position information, the orientation information, and the shop information from each of the group of the shop vehicles allowed to gather at the predetermined destination so that the mall is constructed, of the plurality of vehicles 30 for constructing the moving body system. The shop information managing unit 2021 acquires the position information and the orientation information at the present point in time, for example, as transmitted from each of the shop vehicles at predetermined cycle intervals. The acquired position information and the orientation information of the respective vehicles are stored in the shop vehicle management information of the shop information management DB 203. In the same manner as described above, the shop information managing unit 2021 acquires the shop information from each of the shop vehicles. The acquired shop information of the respective vehicles is stored in the shop vehicle management information of the shop information management DB 203.

The meeting instruction generating unit 2022 selects at least one shop vehicle 30 from the group of the shop vehicles for constructing the mall on the basis of the position information, the orientation information, and the shop information collected from the respective shop vehicles. The selected shop vehicle 30 is set as the meeting place for the users who utilize the service provided in the mall. The setting of the meeting place, which is effected with respect to the shop vehicle 30 by the meeting instruction generating unit 2022, is performed by making reference to the shop information management DB 203.

The meeting instruction generating unit 2022 selects the shop vehicle 30 which can be utilized as the meeting place, for example, from the relative positional relationship of the respective shop vehicles in the mall. Alternatively, the shop vehicle 30, which can be utilized as the meeting place, may be selected on the basis of the business hours and the classification of the service provided by each of the shop vehicles included in the shop information and/or the size of the shop vehicle and the number of people capable of getting on the shop vehicle. The shop vehicle 30, which can be utilized as the meeting place for the users who utilize the mall, may be selected by combining the relative positional relationship of the respective shop vehicles for constructing the mall, with the shop attribute including, for example, the service classification and the business hours of the respective shop vehicles as described above. It is appropriate that the shop vehicle 30, which can be utilized as the meeting place, is at least selected from the group of the shop vehicles for constructing the mall.

Note that when the shop vehicle 30, which can be utilized as the meeting place, is selected, the meeting instruction generating unit 2022 may generate a map with which it is possible to specify the relative arrangement relationship of the respective shop vehicles in the mall, on the basis of the collected position information and the orientation information. The meeting instruction generating unit 2022 arranges the respective shop vehicles in the map corresponding to the predetermined region in which the mall is constructed, for example, by making reference to the map data stored, for example, in the auxiliary storage device. The respective shop vehicles are arranged on the basis of the position information and the orientation information of each of them. In the generated map, the shop vehicle 30, which is selected as the meeting place, is arranged in a manner capable of being distinguished.

The user terminal 40 of the user is notified of the map which is generated by the meeting instruction generating unit 2022, for example, in response to the request of the user who utilizes the mall. The user can utilize the shop vehicle 30 set as the meeting place as the joining place in the mall, by making reference to the map presented on the display device of the user terminal 40. The map, which is generated by the meeting instruction generating unit 2022, is stored as the shop arrangement management information in the shop information management DB 203.

The meeting instruction generating unit 2022 notifies the shop vehicle 30 selected as the meeting place of the instruction to the effect that the shop vehicle 30 functions as the meeting place. Further, the meeting instruction generating unit 2022 contemplates the differentiation in relation to the appearance with respect to the other shop vehicles 30 so that the user can recognize that the shop vehicle 30, which is selected as the meeting place, is the meeting place of the group of the shop vehicles for constructing the mall.

The meeting instruction generating unit 2022 makes reference, for example, to the shop information management DB 203 to acquire the screen image data which is exclusively usable for the shop vehicle 30 selected as the meeting place, from the screen image data management information. The screen image data, which is exclusively usable for the shop vehicle 30 selected as the meeting place, includes a model or template capable of displaying, for example, the keyword and/or the name of the user as well as the message of the fact that the shop vehicle 30 is the meeting place as described above. Then, the meeting instruction generating unit 2022 notifies, for example, the shop vehicle 30 selected as the meeting place of the instruction to the effect that the shop vehicle 30 functions as the meeting place together with the acquired screen image data. The shop vehicle 30, which is set as the meeting place, acquires the notified screen image data from the management server 20, and the screen image data is stored in the storage unit 33*f*. The shop vehicle 30, which is set as the meeting place, displays the screen image data on the external display by the aid of the screen image output unit 36, and thus it is contemplated to effect the differentiation in relation to the appearance in the mall. Note that the screen image data, of which the shop vehicle 30 is notified, may be, for example, information to instruct the data source of the screen image data (for example, URL (Uniform Resource Locator)). The shop vehicle 30 may acquire the screen image data from the data source included in the notification, and the screen image data may be displayed, for example, on the external display provided on the outer wall of the vehicle body.

Note that if a plurality of the shop vehicles 30 are selected as the meeting places, the management server 20 notifies the cooperating center server 10 of the joining instructions to allow the shop vehicles 30 to join with each other. The joining instruction includes the information (vehicle ID) of each of the shop vehicles selected as the meeting places. In the center server 10 which receives the notification of the joining instruction from the management server 20, the operation command is generated so that the shop vehicles, which are selected as the meeting places, join with each other in the mall on the basis of the information of the respective shop vehicles included in the joining instruction.

Next, the shop information management DB 203 will be explained. At least the shop vehicle management information, the screen image data management information, and the shop arrangement management information are stored in the shop information management DB 203.

The shop vehicle management information is the information for managing the state of each of the shop vehicles 30 for constructing the mall. FIG. 5 explains the shop vehicle management information configured as a table. As indicated in FIG. 5, the shop vehicle management information has respective fields of "vehicle ID", "name of shop", "type", "dealing commercial product", "dealer ID", "business hours", "vehicle size", "number of people capable of getting on", "present position", "appearance", and "meeting vehicle". The vehicle ID, the dealer ID, and the present position are the same as or equivalent to those of the vehicle management information indicated in FIG. 4, and hence any explanation thereof is omitted. However, the present position, which is stored in the shop vehicle management information, includes the orientation or azimuth (degrees) measured clockwise from the true north. For example, in FIG. 5, "X1" stored in the present position indicates the latitude, "Y1" indicates the longitude, and "Z1" indicates the orientation (degrees).

The name of shop is the name of the shop vehicle 30 for constructing the mall. Type is the type of the service provided by the shop vehicle 30. For example, the information is stored such that the information is "restaurant" if the eating/drinking service of, for example, pizza, hamburger, or soba (Japanese buckwheat noodles) is provided for the user, the information is "tearoom" if the tea drinking/coffee shop service of snack such as coffee, sandwich or the like is provided, the information is "fashion" if the selling service of, for example, clothes is provided, or the information is "amusement" if the service of, for example, game and/or karaoke is provided. The dealing commercial product is the information of, for example, the commercial product dealt with in the shop vehicle 30. The dealing commercial product includes the table number which indicates details of the dealing commercial product transmitted as the shop information from the shop vehicle 30. The business hours are the information which indicates the start time and the termination time for providing the commercial product and the labor/service of the shop vehicle 30 in the mall. The vehicle size is the information which indicates the size (width (W), height (H), depth (D)) of the shop vehicle 30. The number of people capable of getting on is the information which indicates the number of people capable of getting on the shop vehicle 30. The appearance is the information which indicates the screen image data for constructing the shop vehicle 30. The meeting vehicle is the information which indicates the shop vehicle set as the meeting place in the mall. As indicated in FIG. 5, a predetermined identifier such as "black circle" or the like is stored in the meeting vehicle field of the shop vehicle 30 selected as the meeting place. Further, the screen image data information, of which the shop vehicle 30 is notified, is stored and updated in the appearance field of the shop vehicle 30 selected as the meeting place.

The screen image data management information is the information which relates to the screen image data of which the shop vehicle 30 selected as the meeting place is notified. FIG. 6 explains the screen image data management information configured as a table. As indicated in FIG. 6, the screen image data management information has respective fields of "display type", "time zone", and "screen image data". The display type is arbitrary reference information which is provided in order to classify the screen image data of which the shop vehicle 30 selected as the meeting place is notified. In FIG. 6, those exemplified are "meeting (spring)" in which the use is comparted in accordance with four seasons of spring, summer, autumn, and winter and "shopping A" which is provided to display the mall advertisement on the appearance when the shop vehicles 30 selected as the meeting places move and join with each other. The time zone is the information which represents the period (start time and termination time) in which the screen image data is used. FIG. 6 exemplifies the periods obtained by dividing the business hours in the mall into four. The screen image data is the information which designates the screen image data of which the shop vehicle 30 selected as the meeting place is notified. Note that FIG. 6 exemplifies the screen image data management information as designated corresponding to the time zone and the season in which the mall is constructed. However, the screen image data, of which the shop vehicle 30 selected as the meeting place is notified, may be further subdivided depending on the weather and/or the scale of the mall to be constructed. The shop vehicle 30, which is selected as the meeting place, can be notified of the screen image data capable of being recognized by the user depending on the weather and the scale of the mall.

Figure 7:
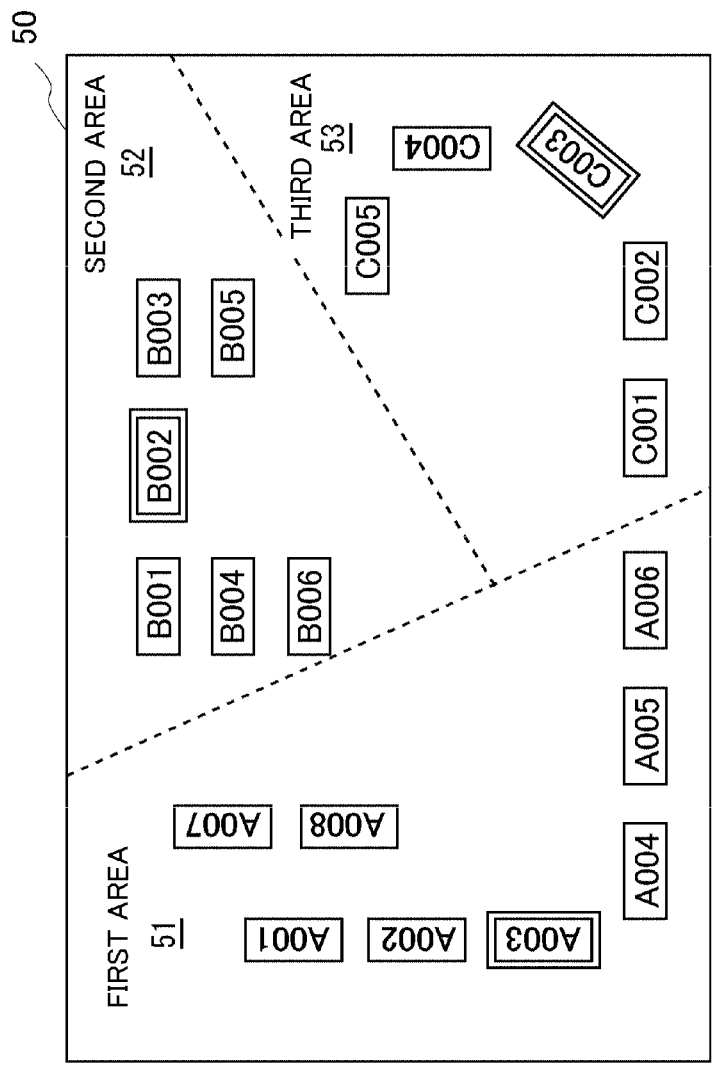
FIG. 7 illustrates exemplary map information.

The shop arrangement management information is the map information for managing the arrangement state of the respective shop vehicles in the mall. The map information, which is generated by the meeting instruction generating unit 2022 on the basis of the position information and the orientation information collected from the respective shop vehicles for constructing the mall, is stored in the shop arrangement management information. FIG. 7 indicates an example of the map information generated by the meeting instruction generating unit 2022. The map exemplified in FIG. 7 is the map with which it is possible to graphically grasp the relative arrangement positions of the respective shop vehicles in the mall constructed by the group of nineteen shop vehicles. Note that as indicated in FIG. 7, the area, in which the respective shop vehicles are arranged, may be comparted into a plurality of blocks depending on, for example, the scale of the mall and/or the service provided by each of the shop vehicles. In FIG. 7, the area (region) 50 for constructing the mall is comparted into three block areas of a first area 51, a second area 52, and a third area 53.

As indicated in FIG. 7, the respective shop vehicles, which construct the mall, are arranged in a predetermined shape (for example, a rectangular shape) in the map. Further, respective shop names (for example, "A001") can be given to the respective shop vehicles having predetermined shapes arranged in the map. The names of the respective shop vehicles arranged in the map may be indicated while being classified for each of the block areas and being separated from the map. Further, the respective shop vehicles, which are arranged in the map, can be distinguished in accordance with the types of the services to be provided. For example, it is also allowable to give attribute information for indicating color classifications such that the restaurant to provide pizza or the like is red, the tearoom to provide snack or the like is blue, and the amusement to provide game, karaoke or the like is yellow. The shop names "A003", "B002", and "C003", which are surrounded by double rectangular frames, are arranged in the map as the shop vehicles 30 selected as the meeting places in the mall. Note that the form of the map managed as the shop arrangement management information is described by way of example. It is possible to appropriately change, for example, the presenting method for indicating the shop arrangement and the presenting method for presenting the shop information.

3. Flow of Process

Figure 8:
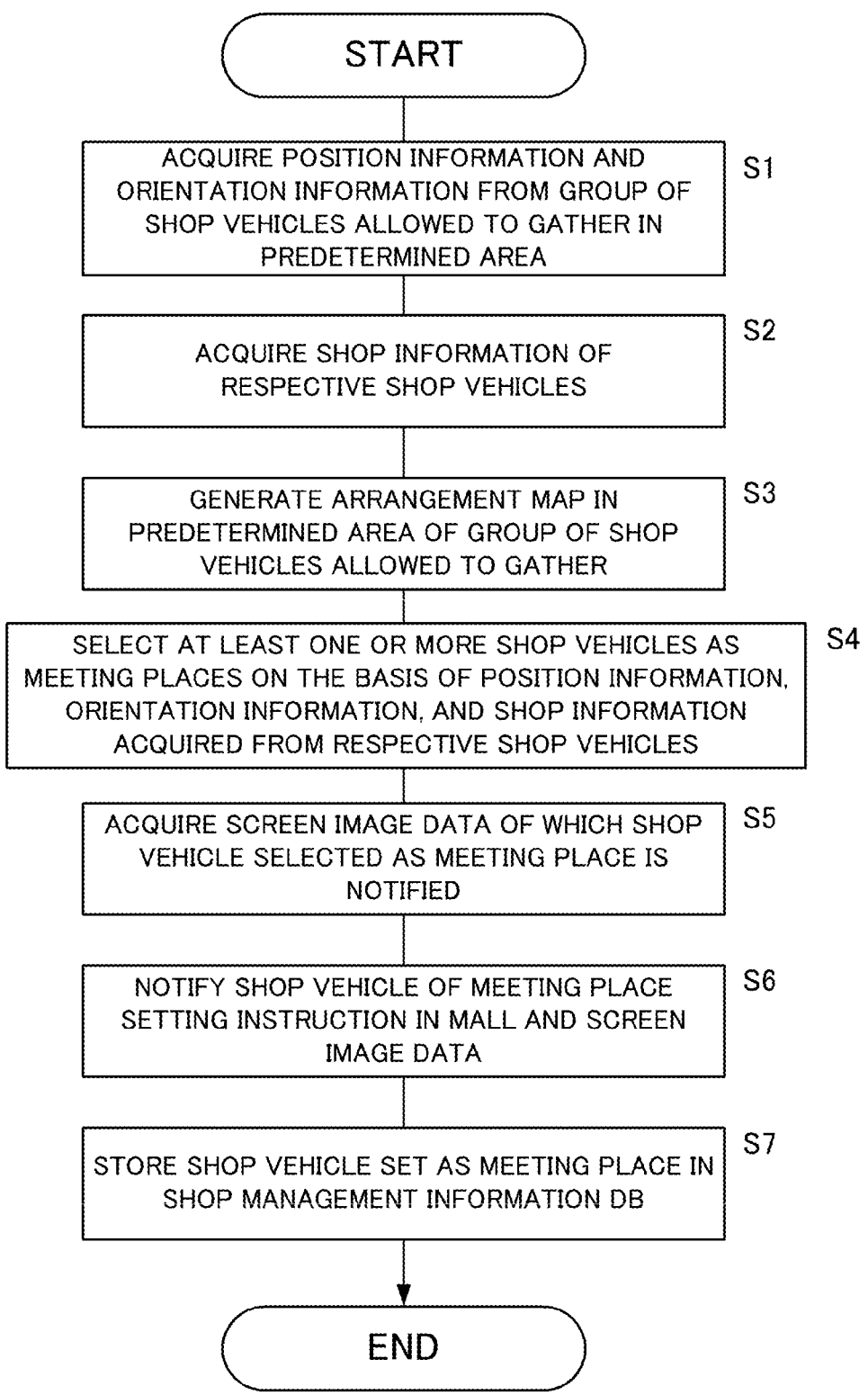
FIG. 8 indicates a flow chart illustrating an exemplary process for setting a meeting place.

Next, an explanation will be made with reference to FIGS. 8 to 12 about the process in relation to the setting the meeting place according to this embodiment. FIG. 8 indicates a flow chart illustrating an exemplary setting process for setting the shop vehicle which functions as the meeting place from the group of the shop vehicles for constructing the mall. The process exemplified in FIG. 8 is executed periodically.

In the flow chart indicated in FIG. 8, the start timing of the process is exemplified by the timing at which the group of the shop vehicles gather at the destination at which the mall is constructed. For example, the respective shop vehicles depart the respective bases which are managed as the base ID's by the vehicle management DB 103 of the center server 10. The respective shop vehicles move along predetermined movement routes, and they gather in the predetermined area in which the mall is constructed. The respective shop vehicles, which gather in the predetermined area, develop, for example, the facilities and the equipment for the purpose of the respective shop businesses. The respective shop vehicles provide the selling of commercial products and the labors/services for the users who utilize the mall. The respective shop vehicles, which gather in the predetermined area, transmit the position information of the subject vehicles, for example, via the network N to the center server 10 and the management server 20, the position information of the subject vehicles being acquired by the position information acquiring unit 32 and the environment detecting unit 33*b*. Further, the respective shop vehicles transmit the acquired shop information of the subject vehicles to the management server 20 connected to the network N by the aid of the shop information transmitting unit 33*d*. The vehicle ID, which unambiguously identifies each of the shop vehicles, is added to the position information, the orientation information, and the shop information transmitted from each of the shop vehicles.

The management server 20 acquires the position information and the orientation information transmitted from each of the group of the shop vehicles allowed to gather in the predetermined area (S1). The management server 20 stores the position information and the orientation information acquired from each of the shop vehicles in the shop information management DB 203 while being correlated with each of the vehicle ID's. The position information and the orientation information, which are transmitted from each of the shop vehicles while being allowed to correspond to the vehicle ID, are stored in the shop vehicle management information of the shop information management DB 203.

In the same manner as described above, the management server 20 acquires the shop information transmitted from the group of the shop vehicles allowed to gather in the predetermined area respectively (S2). The shop information, which is acquired from each of the shop vehicles, is stored in the shop vehicle management information of the shop information management DB 203 while being correlated with each of the vehicle ID's. As explained with reference to FIG. 5, the shop information includes the information to indicate the name of shop, the type, the dealing commercial product, the dealer ID, the business hours, the vehicle size, the number of people capable of getting on, and the appearance for each of the shop vehicles for constructing the mall.

In this case, the processes of S1, S2 executed by the management server 20 correspond to an example of the "acquirer configured to acquire position information, orientation information, and attribute information of the mobile shop vehicle for providing the service from each of the group of the mobile shop vehicles".

The management server 20 makes reference to the shop vehicle management information stored in the shop information management DB 203 to generate the map which indicates the arrangement positions in the predetermined area of the group of the shop vehicles allowed to gather so that the mall is constructed (S3). As explained with reference to FIG. 7, the map, with which it is possible to graphically grasp the relative arrangement positions of the respective shop vehicles in the mall, is generated in HTML (HyperText Markup Language) or the like. The management server 20 stores the generated map as the shop arrangement management information in the shop information management DB 203.

In this case, it is affirmed that the process of S3 executed by the management server 20 is the process of the managing unit which "generates map information of the shopping district composed of the mobile shop vehicles including the one or more mobile shop vehicles each of which functions as the meeting place, on the basis of the position information, the orientation information, and the attribute information of the mobile shop vehicle for providing the service acquired from each of the group of the mobile shop vehicles".

The management server 20 selects at least one or more shop vehicles from the group of the shop vehicles for constructing the mall, as the meeting places of the mall, on the basis of the position information, the orientation information, and the shop information acquired from the respective shop vehicles (S4). The management server 20 selects the shop vehicle 30 which can be utilized as the meeting place, for example, in accordance with the relative positional relationship of the respective shop vehicles in the mall. The plurality of shop vehicles 30, which can be utilized as the meeting places, are selected, for example, depending on the number and the quantity of the group of the shop vehicles for constructing the mall and the scale of the construction of the mall. The shop vehicle 30, which is selected as the meeting place, may be selected, for example, on the basis of the condition of the classification of the service provided by each of the shop vehicles included in the shop information, the business hours, the size of the shop vehicle, and the number of people capable of getting on. Further, the shop vehicle 30, which can be utilized as the meeting place, may be selected by combining the relative positional relationship of the respective shop vehicles for constructing the mall and the shop attribute such as the classification of the service of each of the shop vehicles, the business hours and the like.

In this case, the process of S4 executed by the management server 20 corresponds to an example of the "selector configured to select one or more mobile shop vehicles each of which functions as a meeting place for users who utilize a shopping district composed of mobile shop vehicles, from a group of the mobile shop vehicles allowed to gather in a predetermined area in order to construct the shopping district composed of the mobile shop vehicles to provide services of different classifications in a composite manner".

The management server 20 acquires the screen image data in order to contemplate the differentiation with respect to the other shop vehicles 30 so that the user can recognize that the selected shop vehicle 30 is the meeting place in the mall (S5). The management server 20 makes reference to, for example, the screen image data management information stored in the shop information management DB 203 to acquire the screen image data capable of being used by only the shop vehicle 30 set as the meeting place. The management server 20 acquires, for example, the screen image data corresponding to the situation provided at the present point in time from the screen image data management information. For example, the management server 20 acquires the screen image data of the display type corresponding to the date and time information provided at the present point in time ("meeting (spring)" in the example indicated in FIG. 6). Further, if the plurality of shop vehicles 30 are selected, the management server 20 acquires the screen image data of the display type to be displayed during the movement when the respective shop vehicles 30 join with each other ("shopping A" in the example indicated in FIG. 6). The acquired screen image data is temporarily stored, for example, in a predetermined area of the main storage device.

The management server 20 notifies the selected shop vehicle 30 of the setting instruction to indicate that the subject vehicle is the meeting place in the mall and the screen image data acquired to effect the differentiation in relation to the appearance with respect to the other shop vehicles 30 in the mall (S6). In the shop vehicle 30 set as the meeting place, the notified screen image data is acquired by the aid of the screen image data acquiring unit 33e, and the screen image data is stored in the storage unit 33f.

The shop vehicle 30, which is set as the meeting place as selected from the group of the shop vehicles for constructing the mall, changes the screen image data to be displayed on the external display for constructing the appearance, on the basis of the screen image data of which the shop vehicle 30 is notified from the management server 20. The user, who utilizes the mall, can visually recognize that the concerning shop vehicle is the meeting place, for example, on the basis of the screen image data displayed on the appearance of the shop vehicle 30 after the change, for example, the message that the subject vehicle is the meeting place in the mall and/or the differentiated display content such as the screen image data or the like which is used, in a restricted manner, for the shop vehicle 30 selected as the meeting place. Further, the screen image data, which is displayed on the appearance of the shop vehicle 30 after the change, may include, for example, the name and/or the keyword of the user accepted mutually from the user who utilizes the shop vehicle as the meeting place.

In this case, the process of S6 executed by the management server 20 corresponds to an example of the "manager configured to instruct the one or more mobile shop vehicles each of which functions as the meeting place to cause a change into an appearance with which it is possible for the users to distinguish, in a differentiated manner, that each of the one or more mobile shop vehicles is the meeting place in the shopping district composed of the mobile shop vehicles".

The management server 20 stores the shop vehicle 30 selected as the meeting place in the shop information management DB 203 (S7). The management server 20 stores, for example, an identifier ("black circle" in the example indicated in FIG. 5) which indicates that the shop vehicle is set as the meeting place, in the meeting vehicle field of the shop vehicle 30 selected as the meeting place. In the same manner as described above, the management server 20 updates the screen image data information stored in the appearance field of the shop vehicle 30 selected as the meeting place with the screen image data information acquired by the process of S5.

Further, the management server 20 updates the map by applying the attribute information ("double frame" in the example indicated in FIG. 7) so that the shop vehicle 30 selected as the meeting place can be distinguished, for example, onto the map stored as the shop arrangement management information. Note that the management server 20 may apply the attribute information (for example, "petals of cherry blossoms" in the meeting (spring) indicated in FIG. 6) which indicates the screen image data displayed on the appearance of the shop vehicle 30 selected as the meeting place, to the shop vehicle arranged on the map. Further, if the plurality of shop vehicles 30 are selected as the meeting places, the management server 20 may add, to the map, the attribute information to the effect that the joining can be made in the mall by utilizing the shop vehicles. The process indicated in FIG. 8 is terminated after the process of S7.

According to the process as described above, in the mobile shop management system 1 concerning this embodiment, at least one or more shop vehicles 30, each of which is selected from the group of the shop vehicles allowed to gather so that the mall is constructed in the predetermined area, can be set as the meeting place for the users who utilize the mall. The plurality of shop vehicles 30, which can be utilized as the meeting places, can be selected depending on, for example, the number and the quantity of the group of the shop vehicles for constructing the mall and the scale of construction of the mall. The shop vehicle 30, which can be utilized as the meeting place, may be selected, for example, from the relative positional relationship of the respective shop vehicles in the mall. Alternatively, the shop vehicle 30, which can be utilized as the meeting place, may be selected on the basis of the attribute information of, for example, the classification of the service provided by each of the shop vehicles, the business hours, the size of the shop vehicle, and the number of people capable of getting on. Further alternatively, the shop vehicle 30, which can be utilized as the meeting place, may be selected on the basis of the combination of the information described above. The shop vehicle 30, which is selected as the meeting place, is notified of the screen image data in order to effect the differentiation with respect to the other shop vehicles 30 so that the user can recognize that the concerning shop vehicle is the meeting place in the mall. The screen image data is, for example, the screen image data which can be used by only the shop vehicle 30 selected as the meeting place. Further, as for the screen image data, it is possible to change the display content depending on, for example, the period in which the mall is constructed.

The shop vehicle 30, which receives the notification, changes the screen image data displayed on the external display in order to construct the appearance, for example, on the basis of the notified screen image data. For example, the shop vehicle 30, which receives the notification, displays the message to the effect that the subject vehicle is the meeting place of the mall, on the external display provided on the outer wall of the vehicle body. Alternatively, the shop vehicle 30 outputs the screen image data (for example, a screen image of gathering of characters of an animation or the like and/or a merry-go-round) with which it is possible to distinguish that the subject vehicle is the meeting place of the mall. The shop vehicle 30, which receives the notification, can provide the appearance of variation corresponding to the season and the period for constructing the mall and the regional environment. The user, who utilizes the mall, can grasp that the concerning shop vehicle is the meeting place of the mall by visually recognizing the display content of the message, the predetermined screen image data or the like displayed on the external display of the shop vehicle 30. As a result, the mobile shop management system 1 according to this embodiment can secure the space which can be utilized as the meeting place by the users who utilize the mall, in the mall constructed by the group of the shop vehicles in the predetermined area. As for the mobile shop management system 1, it is possible to suppress, to the minimum, the influence exerted by the weather including the cold, the heat, the rain, the wind, the snow, and the solar radiation caused in the outdoor environment in which the mall is constructed. According to the mobile shop management system 1, it is possible to provide the technique for securing the space which can be utilized as the meeting place in the composite commercial facility constructed by the plurality of mobile shop vehicles.

Figure 9:
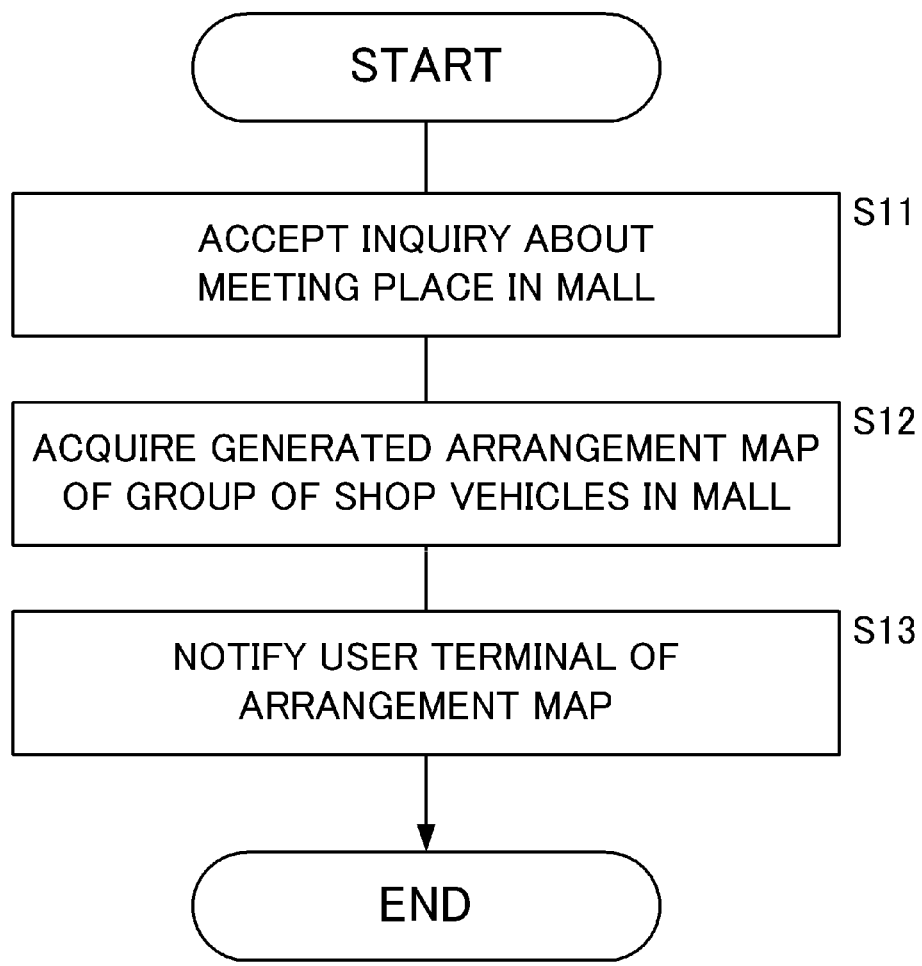
FIG. 9 indicates a flow chart illustrating an exemplary process for presenting map information to a user.

Next, FIG. 9 will be explained. FIG. 9 indicates a flow chart illustrating an example of the presenting process for presenting, to the user, the map information for managing the arrangement state of the group of the shop vehicles for constructing the mall. Note that the map for managing the arrangement state of the group of the shop vehicles for constructing the mall is generated by the process of S3 indicated in FIG. 8.

In the flow chart indicated in FIG. 9, the start timing of the process is exemplified by the timing at which the user, who utilizes the mall, makes an inquiry via the user terminal 40 in relation to the meeting place in the mall. The management server 20 accepts the inquiry in relation to the meeting place from the user terminal 40 connected via the network N (S11). The management server 20 acquires, for example, the information (IP address (Internet Protocol address), MAC address (Media Access Control address) or the like) for specifying the user terminal 40 which accepts the inquiry, and the acquired information is temporarily stored in a predetermined area of the main storage device.

The management server 20 makes reference to the shop information management DB 203 to acquire the map information (arrangement map) stored as the shop arrangement management information (S12). In the map information, the arrangement is effected so that the relative arrangement positions of the respective shop vehicles for constructing the mall can be graphically grasped. For example, as indicated in FIG. 7, the respective shop vehicles for constructing the mall are arranged in the predetermined shape such as the rectangular shape or the like, and the shop name of each of the shop vehicles is applied as the attribute information. Note that the attribute information, which indicates the color classification corresponding to the type of the service to be provided, may be applied to each of the shop vehicles arranged in the map. The attribute information (for example, the double frame indication or the like) is applied to the shop vehicle 30 which is set as the meeting place in the map so that the shop vehicle 30 can be distinguished from the other shop vehicles 30. Further, the attribute information, which indicates the screen image data displayed on the appearance of the shop vehicle, may be applied to the shop vehicle 30 which is set as the meeting place. Further, when the plurality of shop vehicles 30 are selected as the meeting places, it is also allowable to add, to the map, the attribute information to the effect that the joining can be made in the mall by utilizing the shop vehicles. In this case, for example, it is also allowable to add, to the map, the attribute information of, for example, the movement schedule to move in the mall in order to make the joining.

Further, if the position information can be acquired from the user terminal 40 which accepts the inquiry, the management server 20 may propose the shop vehicle 30 which is the nearest meeting place for the user on the basis of the acquired position information. The management server 20 may add, to the map, the message to the effect that the concerning shop vehicle is the nearest meeting place, for example, after the attribute information is applied, for example, such that the shop vehicle 30, which is set as the meeting place nearest to the user, is highlighted on the map. For example, the management server 20 can propose the shop vehicle "A003" which is set in the first area 51, as the meeting place provided mutually for the user who is positioned in the vicinity of the shop vehicle "A001" indicated in FIG. 7 and the user who is positioned in the vicinity of the shop vehicle "A006", the users being scheduled to join in the mall.

The management server 20 notifies the user terminal 40 which accepts the inquiry, of the acquired map information (S13). The user, who utilizes the mall, reads the notified map information by the aid of the display device of the user terminal 40, and thus the user can grasp the shop vehicle 30 which is set as the meeting place in the mall. For example, the users, who mutually have the user terminals 40a, 40b, can utilize the shop vehicle 30 set as the meeting place as the joining place in the mall by making reference to the displayed map information.

In this case, it is affirmed that the process of S13 executed by the management server 20 is the process of the managing unit such that "a terminal of the user who utilizes the shopping district composed of the mobile shop vehicles is notified of" the generated map information.

According to the process as described above, in the mobile shop management system 1 concerning this embodiment, it is possible to present the map information which makes it possible to graphically grasp the relative arrangement positions of the respective shop vehicles in the mall and the shop vehicle 30 set as the meeting place, in accordance with the request of the user who utilizes the mall. The user, who utilizes the mall, can select the shop vehicle 30 set as the meeting place as the joining place in the mall on the basis of the presented map information. In the mobile shop management system 1 according to this embodiment, it is possible to improve the usability for the user who utilizes the mall.

Figure 11:
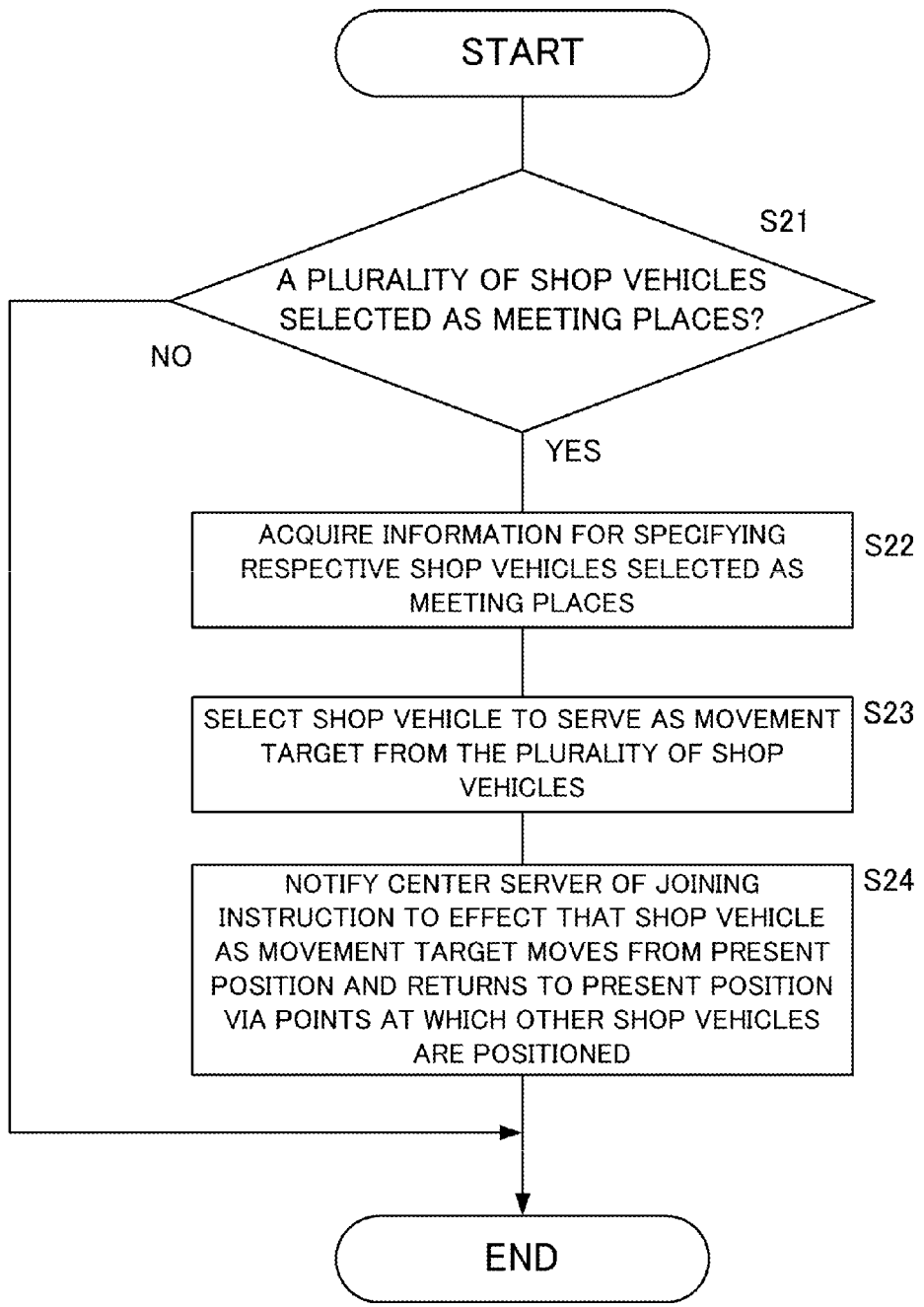
FIG. 11 indicates a flow chart illustrating an exemplary process for generating a joining instruction.
Figure 12:
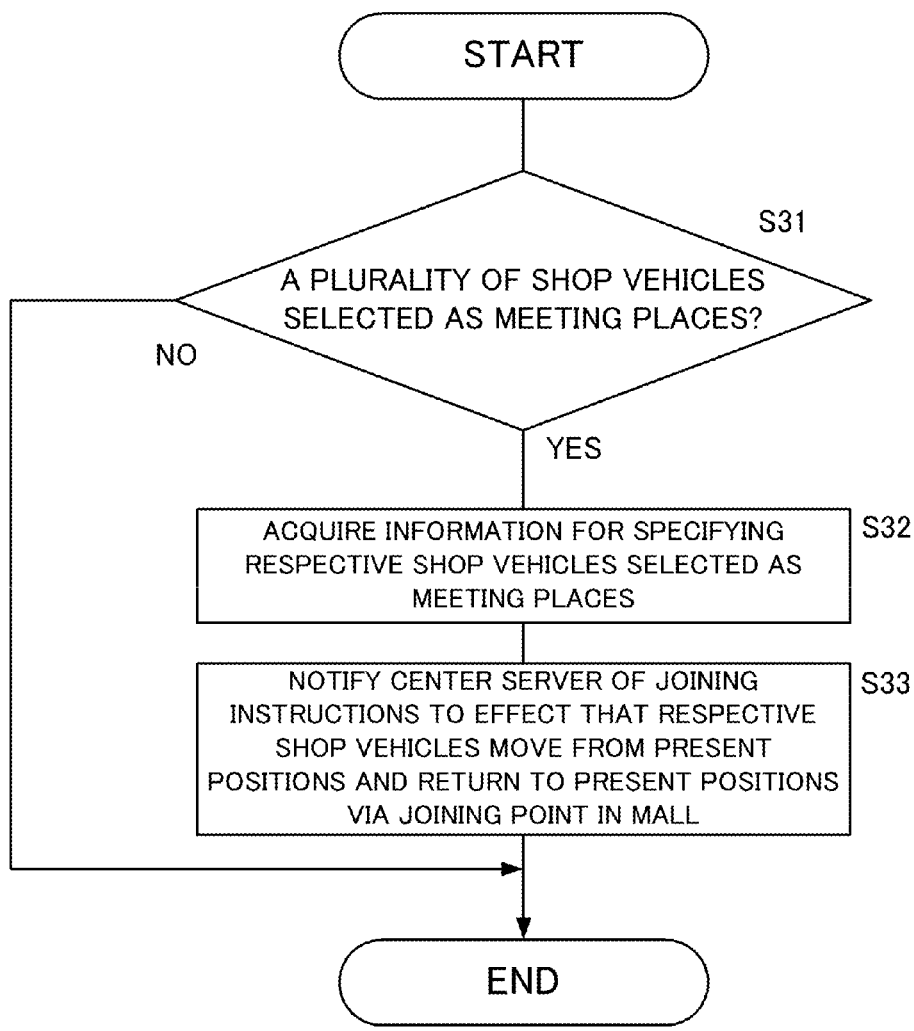
FIG. 12 indicates a flow chart illustrating another exemplary process for generating a joining instruction.

Next, an explanation will be made with reference to FIGS. 10 to 12 about the generating process for generating the joining instructions provided mutually for the shop vehicles 30 set as the meeting places.

Figure 10:
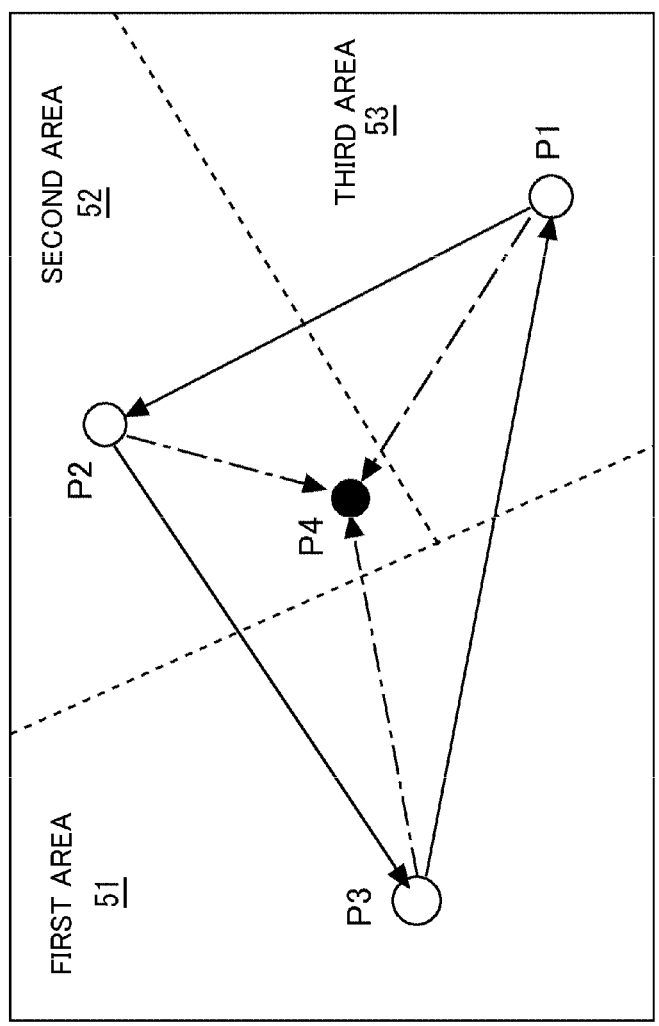
FIG. 10 explains joining movement brought about mutually by shop vehicles set as meeting places.

FIG. 10 explains the joining movement brought about mutually in the mall by the plurality of shop vehicles 30 set as the meeting places. As indicated in FIG. 10, it is assumed that the area (region) for constructing the mall is comparted into three block areas of a first area 51, a second area 52, and a third area 53, and the shop vehicles 30, which can be utilized as the meeting places, are set in the respective areas. The first area to the third area are the comparted areas as exemplified in FIG. 7. The shop vehicle 30, which is utilizable as the meeting place, is provided for each of the areas. The shop vehicles 30 utilizable as the meeting places are the shop vehicles 30 having the shop name "A003" in the first area 51, the shop name "B002" in the second area 52, and the shop name "C003" in the third area 53.

Note that the shop vehicle 30, which is set as the meeting place in the first area 51, is also referred to as "meeting vehicle 30A", the shop vehicle 30, which is set as the meeting place in the second area 52, is also referred to as "meeting vehicle 30B" and the shop vehicle 30, which is set as the meeting place in the third area 53, is also referred to as "meeting vehicle 30C". It is assumed that the position of the "meeting vehicle 30A" in the mall is the point P3, the position of the "meeting vehicle 30B" is the point P2, and the position of the "meeting vehicle 30C" is the point P1. An explanation will be made below with reference to FIG. 10 about the generating process for generating the joining instructions provided mutually for the shop vehicles 30 as indicated in FIGS. 11 and 12. FIG. 11 indicates a flow chart illustrating an example of the joining instruction generating process for allowing the meeting vehicle as the movement target to join via the points at which the other meeting vehicles are positioned. Further, FIG. 12 indicates a flow chart illustrating an example of the joining instruction generating process for allowing the plurality of meeting vehicles to join in the mall.

At first, the process of FIG. 11 will be explained. In the flow chart indicated in FIG. 11, the start timing of the process is exemplified by the timing at which the shop vehicle 30, which is selected as the meeting place, is subjected to the joining movement. The joining movement in the mall of each of the shop vehicles selected as the meeting places is performed, for example, periodically, for example, in a unit of hour or in a unit of half day. The management server 20 judges whether or not a plurality of the shop vehicles are set as the meeting places (S21). If the plurality of shop vehicles are not set as the meeting places (S21, "No"), the management server 20 terminates the process of FIG. 11. On the other hand, if the plurality of shop vehicles are set as the meeting places (S21, "Yes"), the management server 20 proceeds to the process of S22.

In the process of S22, the management server 20 acquires the information for specifying the respective shop vehicles selected as the meeting places. The management server 20 makes reference to the shop vehicle management information stored in the shop information management DB 203 to acquire the vehicle ID's of the respective shop vehicles set as the meeting places. The acquired vehicle ID of each of the shop vehicles is temporarily stored in a predetermined area of the main storage device.

The management server 20 selects the shop vehicle 30 which serves as the movement target, from the plurality of shop vehicles 30 set as the meeting places (S23). The management server 20 selects, for example, the meeting vehicle 30C positioned at the point P1 of the third area 53 in the mall area indicated in FIG. 10, as the shop vehicle 30 to serve as the movement target in the mall area. Note that the selection of the shop vehicle 30 as the movement target is arbitrary. The meeting vehicle 30A may be selected, or the meeting vehicle 30B may be selected.

With reference to FIG. 11 again, the management server 20 generates the joining instruction to the effect that the departure point is the present point of the shop vehicle 30 selected as the movement target and the shop vehicle 30 returns to the present position via the points at which the other shop vehicles 30 set as the meeting places in the mall are positioned. The joining instruction includes, for example, the vehicle ID of the meeting vehicle 30C as the movement target and the vehicle ID's of the meeting vehicles 30B, 30A as the joining targets positioned at the transit points. Then, the management server 20 notifies the cooperating center server 10 of the generated joining instruction (S24). After the process of S24, the process indicated in FIG. 11 is terminated.

In this case, it is affirmed that the "meeting vehicle 30C" corresponds to the "first mobile shop vehicle included in the one or more mobile shop vehicles each of which functions as the meeting place", and the "meeting vehicle 30B" corresponds to the "second mobile shop vehicle included in the one or more mobile shop vehicles each of which functions as the meeting place". The management server 20 moves the meeting vehicle 30C in the mall via the point at which the meeting vehicle 30B is positioned so that the meeting vehicle 30C joins in accordance with the process of S24. Therefore, it is affirmed that the process of S24 is an example of the managing unit which "generates a joining instruction for moving the first mobile shop vehicle via a point of the second mobile shop vehicle positioned in the predetermined area".

The operation command generating unit 1022 of the center server 10, which receives the notification from the cooperating management server 20, generates the operation command for the meeting vehicle 30C. For example, with reference to FIG. 10, the operation command generating unit 1022 acquires the position information (point P3) at the present point in time of the meeting vehicle 30A set in the first area 51 in the mall area, on the basis of the vehicle ID of each of the meeting vehicles included in the joining instruction. In the same manner as described above, the position information (point P2) of the meeting vehicle 30B in the second area 52 and the position information (point P1) of the meeting vehicle 30C in the third area 53 are acquired. Then, the operation command generating unit 1022 specifies the movement route of the meeting vehicle 30C in which the point P1 is the departure point, and the meeting vehicle 30C moves via the point P2 at which the meeting vehicle 30B is positioned and the point P3 at which the meeting vehicle 30A is positioned as the joining points in the mall area to return to the point P1 (solid line arrows indicated in FIG. 10). The operation command generating unit 1022 generates the operation command for the meeting vehicle 30C on the basis of the specified movement route. The operation command includes the instructions at the respective joining points, including, for example, "temporarily stop" and "allow user to get on/off". The meeting vehicle 30C is notified of the operation command generated by the center server 10, and the movement is performed in the mall via the points at which the meeting vehicles 30B, 30A are positioned (P2, P3) as the joining points. Note that the screen image data for advertizing the mall (FIG. 6, shopping A) is displayed on the appearance of the meeting vehicle 30C during the movement, for example, as explained with reference to FIG. 8.

Next, the flow chart indicated in FIG. 12 will be explained. In the process indicated in FIG. 12, the instructions are generated so that the plurality of meeting vehicles are allowed to join at the joining point in the mall. In FIG. 12, the processes of S31 and S32 are the same as or equivalent to the processes of S21 and S22 indicated in FIG. 11 respectively.

In the process of S33, the management server 20 generates the instructions so that the respective shop vehicles, which are set as the meeting places, are allowed to move and join in the moll respectively. The management server 20 generates the joining instructions to the effect that the respective shop vehicles use the present points as the departure points and return to the present points via the joining point in the mall respectively. The joining instructions include the vehicle ID's of the respective meeting vehicles allowed to move in the mall in order to effect the joining. Then, the management server 20 notifies the cooperating center server 10 of the generated joining instructions. The process indicated in FIG. 12 is terminated after the process of S33.

In this case, it is affirmed that the "meeting vehicle 30A" corresponds to the "first mobile shop vehicle included in the one or more mobile shop vehicles each of which functions as the meeting place", and the "meeting vehicle 30B" corresponds to the "second mobile shop vehicle included in the one or more mobile shop vehicles each of which functions as the meeting place". The management server 20 generates the instructions to move the respective shop vehicles set as the meeting places in the mall respectively so that the respective shop vehicles join in accordance with the process of S33. Therefore, it is affirmed that the process of S33 is an example of the managing unit which "generates joining instructions for allowing a first mobile shop vehicle included in the one or more mobile shop vehicles each of which functions as the meeting place and a second mobile shop vehicle included in the one or more mobile shop vehicles each of which functions as the meeting place to join in the predetermined area".

The operation command generating unit 1022 of the center server 10, which receives the notification from the management server 20, generates the operation commands for the meeting vehicles 30A, 30B, 30C respectively. The operation command generating unit 1022 acquires the position information at the present point in time of the respective meeting vehicles in the mall area, on the basis of the vehicle ID's of the respective meeting vehicles included in the joining instructions. For example, with reference to FIG. 10, the position information (point P3) of the meeting vehicle 30A in the first area 51, the position information (point P2) of the meeting vehicle 30B in the second area 52, and the position information (point P1) of the meeting vehicle 30C in the third area 53 are acquired.

The operation command generating unit 1022 makes reference to, for example, the position information of the respective meeting vehicles and the map data stored in the auxiliary storage device to specify the joining point in the mall (for example, point P4 indicated in FIG. 10) at which the respective meeting vehicles can park and stop. Then, the operation command generating unit 1022 specifies the movement route of the meeting vehicle 30C in which the point P1 is the departure point and the meeting vehicle 30C returns to the departure point P1 via the joining point P4, as exemplified by alternate long and short dash lines indicated in FIG. 10. In the same manner as described above, the movement route of the meeting vehicle 30B in which the point P2 is the departure point and the meeting vehicle 30B returns to the departure point P2 via the joining point P4 and the movement route of the meeting vehicle 30A in which the point P3 is the departure point and the meeting vehicle 30A returns to the departure point P3 via the joining point P4 are specified.

The operation command generating unit 1022 generates the operation commands for the meeting vehicles 30A, 30B, 30C on the basis of the specified movement routes. The operation commands include the instructions at the joining point of, for example, "temporarily stop", "allow user to get on/off", "wait for arrival of meeting vehicles 30A, 30B", "wait for arrival of meeting vehicles 30B, 30C", and "wait for arrival of meeting vehicles 30C, 30A". The respective meeting vehicles are notified of the operation commands generated by the center server 10, and the movement is performed via the joining point P4 in the mall. The screen image data for advertizing the mall is displayed on the appearance of each of the meeting vehicles during the movement.

According to the process as described above, in the mobile shop management system 1 concerning this embodiment, if the plurality of meeting vehicles (30A, 30B, 30C) are set in the mall, it is possible to generate the joining instructions so that the respective meeting vehicles are mutually moved to join in the mall. The respective meeting vehicles can move in the mall and join on the basis of the generated joining instructions. The users, who get on the respective meeting vehicles, can join with each other while avoiding the influence exerted by the weather including, for example, the cold, the heat, the rain, the wind, the snow, and the solar radiation caused in the outdoor environment in which the mall is constructed. According to the mobile shop management system 1 concerning this embodiment, it is possible to provide the joining service for the users who utilize the mall in the state in which the influence of the weather in the outdoor environment is avoided as far as possible.

«Computer-Readable Recording Medium»

The program, which allows the information processing apparatus or other machine or apparatus (hereinafter referred to as "computer or the like") to realize any one of the functions described above, can be recorded on a recording medium which is readable by the computer or the like. Then, the functions can be provided by reading and executing the program of the recording medium by the computer or the like.

In this context, the recording medium, which is readable by the computer or the like, refers to any recording medium on which the information including, for example, the data and the program can be accumulated by means of the electric, magnetic, optical, mechanical, or chemical action and the information can be read by means of the computer or the like. Among the recording media as described above, those removable from the computer or the like are, for example, flexible disk, magneto-optical disk, CD-ROM, CD-R/W, DVD, blue-ray disk, DAT, 8 mm tape, and memory card such as flash memory or the like. Further, the recording medium fixed to the computer or the like includes, for example, hard disk and ROM.

What is claimed is:

1. An information system comprising:
    a selector configured to select one or more mobile shop vehicles each of which functions as a meeting place for users who utilize a shopping district composed of mobile shop vehicles, from a group of the mobile shop vehicles allowed to gather in a predetermined area in order to construct the shopping district composed of the mobile shop vehicles to provide services of different classifications in a composite manner, on the basis of a position information, an orientation information, and a shop attribute collected from the respective shop vehicles;
    an acquirer configured to acquire position information, orientation information, and attribute information of the mobile shop vehicle for providing the service from each of the group of the mobile shop vehicles; and
    a manager configured to:
    instruct the one or more mobile shop vehicles each of which functions as the meeting place to display information related to the meeting place on an external display of each of the one or more mobile shop vehicles such that the users identify each of the one or more mobile shop vehicles as the meeting place in the shopping district composed of the mobile shop vehicles; and
    generate map information of the shopping district composed of the mobile shop vehicles including the one or more mobile shop vehicles, on the basis of the position information, the orientation information, and the attribute information of the mobile shop vehicle for providing the service acquired from each of the group of the mobile shop vehicles, and notify the map information to a terminal of one or more of the users.

2. The information system according to claim 1, wherein the manager notifies the one or more mobile shop vehicles each of which functions as the meeting place of appearance data for constructing the appearance with which it is possible for the users to distinguish, in the differentiated manner, that each of the one or more mobile shop vehicles is the meeting place in the shopping district composed of the mobile shop vehicles.

3. The information system according to claim 1, wherein the manager generates joining instructions for allowing a first mobile shop vehicle included in the one or more mobile shop vehicles each of which functions as the meeting place and a second mobile shop vehicle included in the one or more mobile shop vehicles each of which functions as the meeting place to join in the predetermined area.

4. The information system according to claim 3, wherein the manager generates a joining instruction for moving the first mobile shop vehicle via a point of the second mobile shop vehicle positioned in the predetermined area.

5. The information system according to claim 1, wherein the one or more mobile shop vehicles each of which functions as the meeting place provide an advertisement of the shopping district composed of the mobile shop vehicles and a free sample of the service provided in the shopping district composed of the mobile shop vehicles, to the users who utilize the shopping district composed of the mobile shop vehicles.

6. An information processing method comprising allowing a computer to execute:
    a selecting step of selecting one or more mobile shop vehicles each of which functions as a meeting place for users who utilize a shopping district composed of mobile shop vehicles, from a group of the mobile shop vehicles allowed to gather in a predetermined area in order to construct the shopping district composed of the mobile shop vehicles to provide services of different classifications in a composite manner, on the basis of a position information, an orientation information, and a shop attribute collected from the respective shop vehicles;

a managing step of instructing the one or more mobile shop vehicles each of which functions as the meeting place to display information related to the meeting place on an external display of each of the one or more mobile shop vehicles such that the users identify each of the one or more mobile shop vehicles as the meeting place in the shopping district composed of the mobile shop vehicles;

generating joining instructions for allowing a first mobile shop vehicle included in the one or more mobile shop vehicles each of which functions as the meeting place and a second mobile shop vehicle included in the one or more mobile shop vehicles each of which functions as the meeting place to join in the predetermined area; and generating a joining instruction for moving the first mobile shop vehicle via a point of the second mobile shop vehicle positioned in the predetermined area.

7. A non-transitory computer readable storing medium recording a computer program for causing a computer to perform a method comprising:

a selecting step of selecting one or more mobile shop vehicles each of which functions as a meeting place for users who utilize a shopping district composed of mobile shop vehicles, from a group of the mobile shop vehicles allowed to gather in a predetermined area in order to construct the shopping district composed of the mobile shop vehicles to provide services of different classifications in a composite manner, on the basis of a position information, an orientation information, and a shop attribute collected from the respective shop vehicles; and a managing step of instructing the one or more mobile shop vehicles each of which functions as the meeting place to display information related to the meeting place on an external display of each of the one or more mobile shop vehicles such that the users identify each of the one or more mobile shop vehicles as the meeting place in the shopping district composed of the mobile shop vehicles, wherein the one or more mobile shop vehicles each of which functions as the meeting place provide an advertisement of the shopping district composed of the mobile shop vehicles and a free sample of the service provided in the shopping district composed of the mobile shop vehicles, to the users who utilize the shopping district composed of the mobile shop vehicles.

* * * * *